United States Patent
Surti et al.

(10) Patent No.: US 9,235,926 B2
(45) Date of Patent: Jan. 12, 2016

(54) TECHNIQUES FOR IMPROVING MSAA RENDERING EFFICIENCY

(71) Applicants: Prasoonkumar Surti, Folsom, CA (US); Thomas A. Piazza, Granite Bay, CA (US)

(72) Inventors: Prasoonkumar Surti, Folsom, CA (US); Thomas A. Piazza, Granite Bay, CA (US)

(73) Assignee: INTEL CORPORATION, Santa Clara, CA (US)

( * ) Notice: Subject to any disclaimer, the term of this patent is extended or adjusted under 35 U.S.C. 154(b) by 408 days.

(21) Appl. No.: 13/726,362

(22) Filed: Dec. 24, 2012

(65) Prior Publication Data

US 2014/0176541 A1    Jun. 26, 2014

(51) Int. Cl.
*G06T 15/00* (2011.01)
*G06T 15/50* (2011.01)
*G06T 11/40* (2006.01)

(52) U.S. Cl.
CPC .............. *G06T 15/503* (2013.01); *G06T 11/40* (2013.01)

(58) Field of Classification Search
CPC ............................... G06T 11/40; G06T 15/503
USPC .......................... 345/420, 428, 581, 611, 613
See application file for complete search history.

(56) References Cited

U.S. PATENT DOCUMENTS

| | | | |
|---|---|---|---|
| 6,204,859 B1 * | 3/2001 | Jouppi et al. ................... 345/592 |
| 6,633,297 B2 * | 10/2003 | McCormack et al. ......... 345/506 |
| 7,403,208 B1 | 7/2008 | Bastos et al. |
| 7,425,955 B2 * | 9/2008 | Long et al. ..................... 345/421 |
| 7,508,398 B1 * | 3/2009 | Montrym et al. ............. 345/568 |
| 7,768,524 B2 | 8/2010 | Snyder et al. |
| 8,044,956 B1 | 10/2011 | Kilgard |
| 8,692,844 B1 * | 4/2014 | Molnar et al. ................. 345/611 |
| 2006/0267991 A1 | 11/2006 | Preetham et al. |
| 2012/0183215 A1 | 7/2012 | Van Hook et al. |

OTHER PUBLICATIONS

International Search Report and Written Opinion received for PCT Patent Application No. PCT/US2013/076430, mailed Mar. 31, 2014, 10 pages.

* cited by examiner

*Primary Examiner* — Phu K Nguyen

(74) *Attorney, Agent, or Firm* — Kacvinsky Daisak Bluni PLLC

(57) ABSTRACT

Various embodiments are generally directed to techniques for causing the storage of a color data value of a clear color to be deferred as rendered color data values are stored for samples. A device comprises a processor circuit and a storage to store instructions that cause the processor circuit to render a pixel from multiple samples taken of a three-dimensional model of an object, the pixel corresponding to a pixel sample data which comprises multiple color storage locations that are each identified by a numeric identifier, and which comprises multiple sample color indices that each correspond to a sample to point to at least one color storage location; and allocate color storage locations in an order selected to define a subset of possible combinations of binary index values among all of the sample color indices as invalid combinations. Other embodiments are described and claimed.

28 Claims, 12 Drawing Sheets

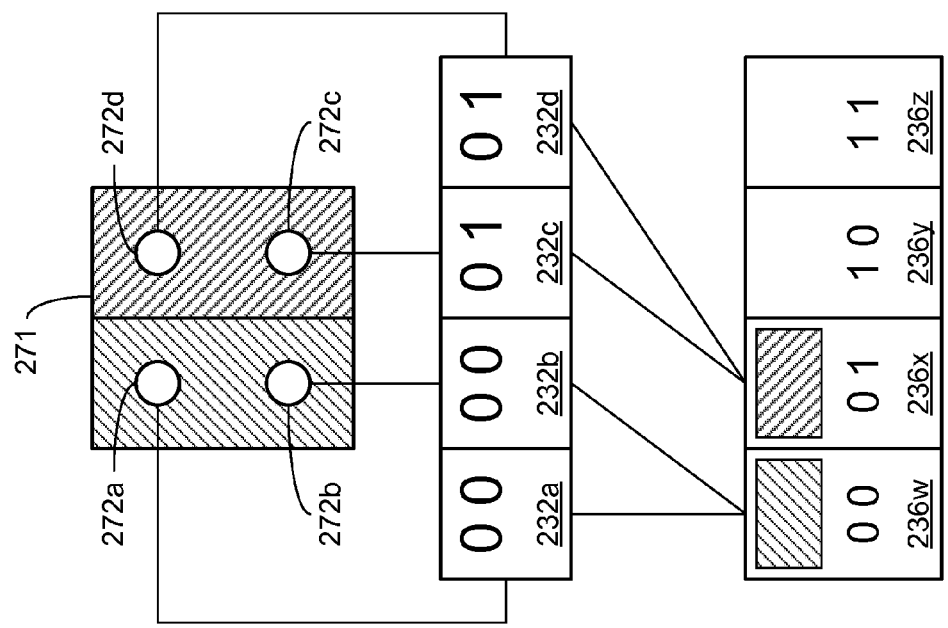

TECHNIQUES FOR IMPROVING MSAA RENDERING EFFICIENCY

BACKGROUND

In efforts to reduce aliasing effects (e.g., jagged lines following boundaries between pixels) in rendering a two-dimensional (2D) image of three-dimensional (3D) object(s), various techniques of super-sampling anti-aliasing (SSAA) have been devised in which the 2D image is first created within a sampling data at a finer resolution than the final 2D image that is later created from that sampling data. Typically, in SSAA, a selected number of samples per pixel of the final 2D image is selected (often 2, 4, 8 or 16), and that number of samples is taken of the 3D object(s) for each pixel from the perspective of each of those pixels within the image plane of the final 2D image. Each sample specifies a color associated with the pixel to which that sample belongs, and the various colors of the samples of each pixel are employed to derive the colors given to each pixel in the final 2D image.

Unfortunately, SSAA is demanding of both memory and processor bandwidth since an entirely separate color data value is always stored for each sample, regardless of whether or not there are regions of one or more pixels in which all of the samples are the same color. In effect, at least in terms of the storage of color data values, the samples in super-sampling are essentially treated as if each were a miniature pixel. In applications where the rendering of 2D images must be done in real time at a rate high enough to support motion video (e.g., the imagery of scenery and characters in a video game), such treatment of samples requires all too costly amounts of processor and memory bandwidth.

In an effort to gain the benefits of sampling at a finer resolution without such high bandwidth requirements, various techniques of multi-sampling anti-aliasing (MSAA) were devised in which separate color data values can be stored for each sample within a pixel, but where it is also possible to store only one color data value for multiple samples in situations where more than one sample has the same color. In effect, this is a form of compression of the color data that takes advantage of situations where a pixel falls within a region of the final 2D image in which there is no transition in color (e.g., no edge) within that pixel such that all of its samples are the same color. In such situations, a single color value is stored only once for all of that pixel's samples. Only in situations where a pixel falls within a region in which there are one or more transitions of color (e.g., crossing an edge) within that pixel such that there are at least two different colors among its samples is the storage of more than one color data value necessary for that pixel's samples.

Unfortunately, despite these efficiencies in storage in MSAA, a common practice of always storing a color data value for a clear color each time a color value is stored for one or more samples of a pixel has limited the degree to which bandwidth requirements can be reduced. It is with respect to these and other considerations that the embodiments described herein are needed.

BRIEF DESCRIPTION OF THE DRAWINGS

FIGS. 6a, 6b and 6c illustrate a portion of the embodiment of FIG. 1 in an uncolored state, in a partially colored state and in a fully colored state.

DETAILED DESCRIPTION

Figure 1:
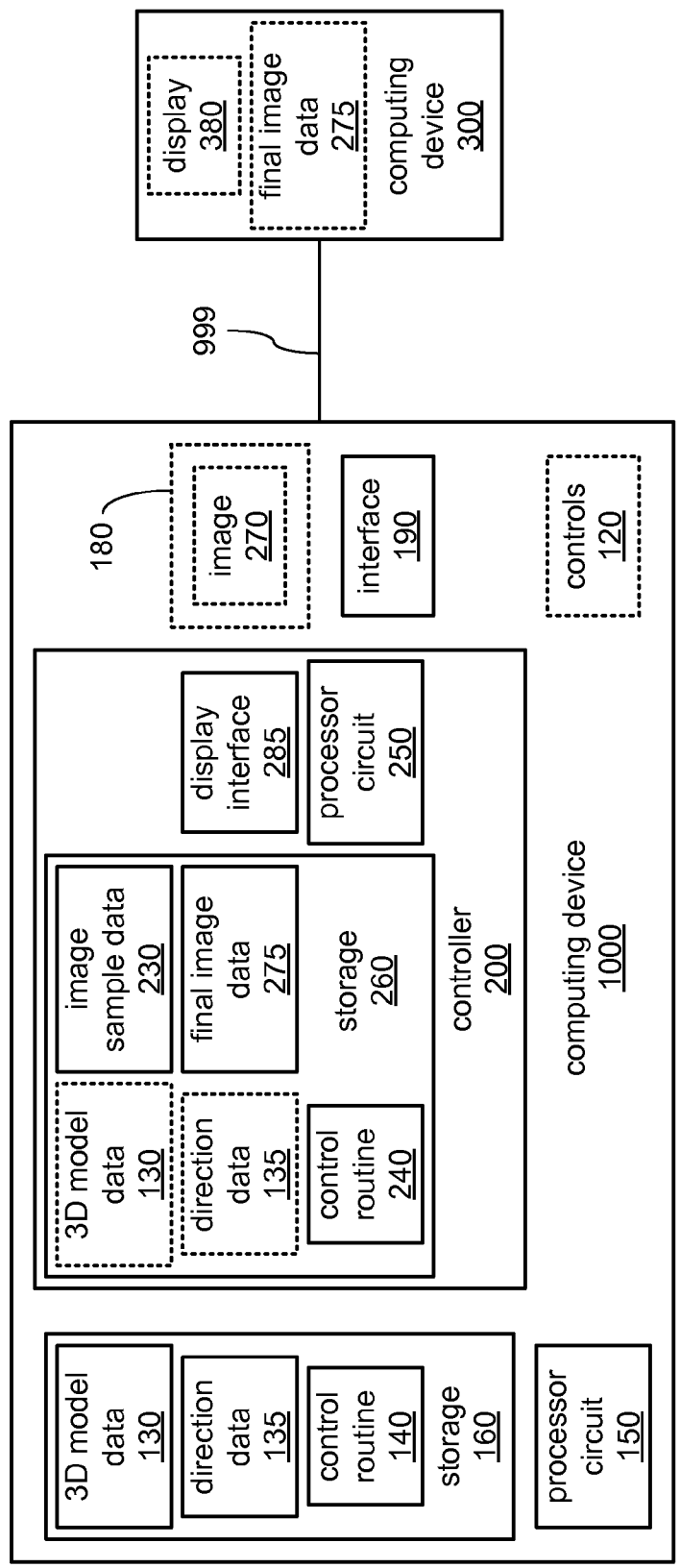
FIG. 1 illustrates an embodiment of a computing device deriving a disparity map.

Various embodiments are generally directed to techniques for causing the storage of a color data value of a clear color to be deferred or entirely avoided as color data values of primitives (e.g., lines, polygons, etc.) are stored for samples. More specifically, the index values identifying color storage locations in which color data values for samples of a pixel are stored are encoded and interpreted in a manner that additionally indicates the current state of storage of color data values for those samples. The states that may be indicated include an initialized uncolored state in which no color data values have yet been stored for any sample of a particular pixel; a partially colored state in which color data value(s) for less than all samples of the pixel have been stored, but none include a color data value for a clear color; and a state in which color data value(s) have been stored for all of the samples, possibly including a color data value for a clear color.

Such use of these index values relies on a common practice in MSAA implementations of organizing the storage of color data values for the samples of a pixel such that the color storage locations allocated for that pixel are always filled with color data values in a particular order. Stated differently, there is a color storage location in which the first color data value for any sample of a particular pixel is always stored, there is a color storage location in which the next color data value is stored, and so on. This leads to a particular order of incrementing and manner of use of each of the index values such that certain combinations of index values would normally be undefined. These otherwise undefined index values are used to enable these index values to indicate one of the aforedescribed states, in addition to identifying color storage locations.

Each time a color data value is to be stored for one or more of the samples of a particular pixel, an index storage location that includes the index values of all of the samples of that pixel is accessed to determine what color storage locations have already been used to store a color data value, and the current state of storage of color data values for the samples of that pixel. This information is used to determine what color storage location is the next available color storage location in which to store the color data value that is now to be stored, and whether a color data value for a clear color for the pixel should now be stored. This information is also used to determine whether the encoding of index values should now be changed to an encoding that indicates a fully colored state in which color data values have now been stored for all samples of that pixel, possibly including a color data value for a clear color.

In one embodiment, for example, a device comprises a processor circuit and a storage communicatively coupled to the processor circuit to store instructions that when executed by the processor circuit cause the processor circuit to render a pixel from multiple samples taken of a three-dimensional model of an object, the pixel corresponding to a pixel sample data, the pixel sample data comprising multiple color storage locations that are each identified by a numeric identifier, and the pixel sample data comprising multiple sample color indices that each correspond to a sample of the multiple samples to point to at least one color storage location of the multiple color storage locations; and allocate color storage locations of the multiple color storage locations in an order selected to define a subset of possible combinations of binary index values among all of the sample color indices as invalid combinations. Other embodiments are described and claimed.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a computing device 1000 that may be coupled to another computing device 300 to provide the other computing device 300 with image data of an image rendered by the computing device 1000. Each of these computing devices 1000 and 300 may be any of a variety of types of computing device, including without limitation, a desktop computer system, a data entry terminal, a laptop computer, a netbook computer, an ultrabook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 1000 and 300 exchange signals conveying rendered images through a network 999. However, one or both of these computing devices may exchange other data entirely unrelated to rendered images with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 1000 incorporates one or more of a processor circuit 150, a storage 160, controls 120, a display 180, a controller 200 and an interface 190. The storage 160 stores at least a control routine 140 and one or more of a 3D model data 130 and a direction data 135. The controller 200 incorporates one or more of a processor circuit 250, a storage 260 and a display interface 285. The storage 260 stores at least a control routine 240 and one or more of a copy of the 3D model data 130, a copy of the direction data 135, an image sample data 230 and a final image data 275.

In executing the control routine 140, the processor circuit 150 is caused to maintain and/or modify the 3D model data 130. It may be that the processor circuit 150 is caused to modify the 3D model data 130 in response to receiving signals conveying commands to do so, possibly via the controls 120 (if present) in response to their being operated and/or possibly from another computing device via the network 999. In some embodiments, the computing device 1000 may be a video game system wherein the 3D model data 130 is a 3D representation of scenery and/or characters in a video game. In some embodiments, the computing device 1000 may be a medical workstation wherein the 3D model data 130 is a 3D representation of tissues, structures and/or organs of a human body. In such embodiments, an operator of the computing device may operate the controls 120 to manipulate the object(s) represented by the 3D model data 130.

Regardless of the purpose for maintaining and/or modifying the 3D model data 130, the processor circuit 150 is further caused by the control routine 140 to convey a copy of the 3D model data 130 to the controller 200 and to signal the controller 200 to render a 2D image of whatever object(s) the 3D model data 130 represents as the image 270. The processor circuit 140 may also be caused to convey the direction data 135 to the controller 200, the direction data 135 including an indication of the location and orientation of an image plane of the image 270 relative to whatever object(s) are represented by the 3D model data 130, thus specifying a perspective from which those object(s) are to be made viewable in the image 270.

In executing the control routine 240, the processor circuit 250 is caused to render the image 270 of the object(s) represented by the 3D model data 130 from the perspective indicated in the direction data 135. In so doing, the processor circuit 250 is caused to rasterize the primitives (e.g., lines, triangles, polygons, etc.) of which those objects are formed in the 3D model data 130 to the image sample data 230. The image sample data 230 includes a 2D image of the subset of primitives of those object(s) viewable from the image plane perspective indicated in the direction data 135 made up of samples of those primitives taken of those primitives from that perspective. The image sample data 230 is a precursor to the final image data 275 that may then be displayed on the display 180 as the image 270. However, the sampling done to create the image sample data 230 is of a higher resolution than the image 270 defined by the final image data 275 will be.

This sampling of the primitives to create the image sample data 230 is done to mitigate occurrences of aliasing in the image 270, and employs multi-sample anti-aliasing (MSAA) performed by the processor circuit 250. Thus, the image sample data 230 includes sample data in which the samples are grouped by the pixels that will ultimately be rendered in the final image data 275 to define the image 270, likely with a selected ratio of samples per pixel. For the sake of efficiency in storing color data values indicating the colors of the samples in the memory components of the storage 260, the colors of multiple ones of the samples in each pixel are specified with a single color data value wherever possible.

Figure 2:
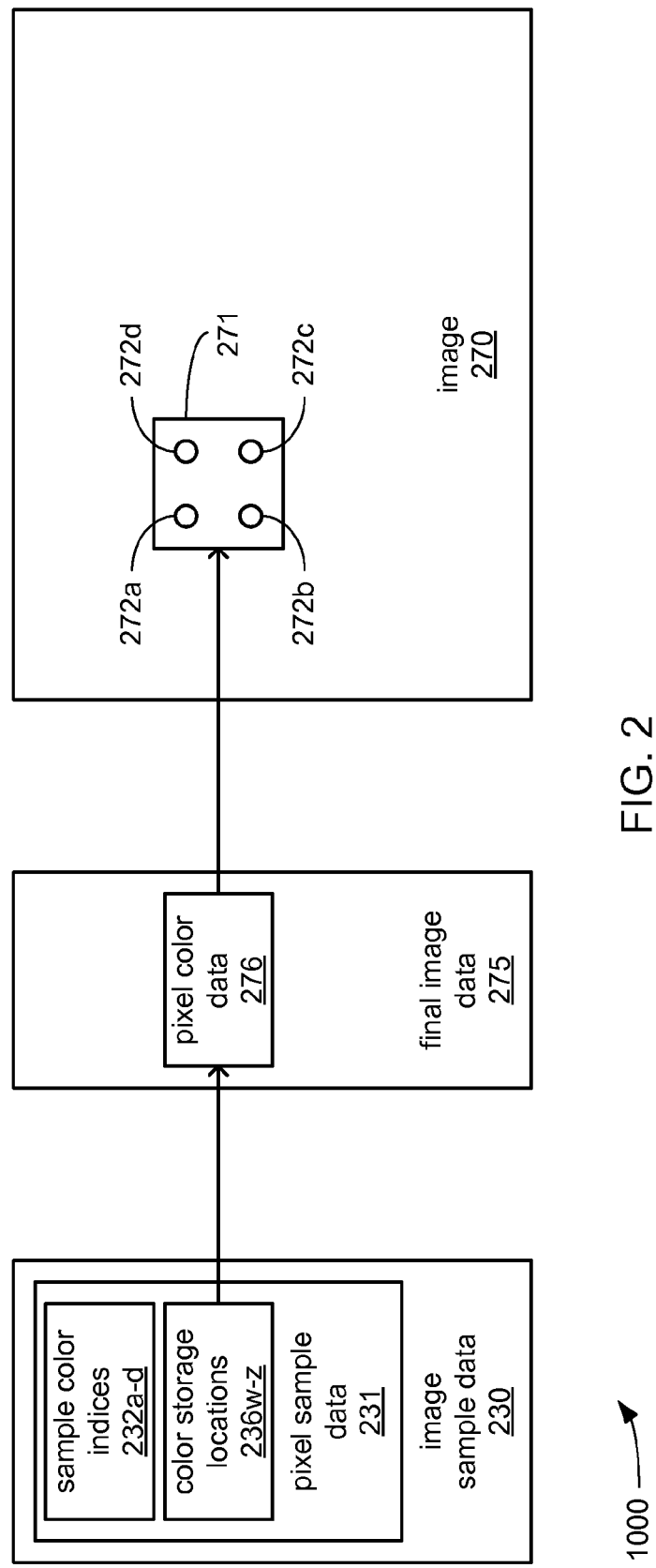
FIG. 2 illustrates a portion of the embodiment of FIG. 1, depicting relationships between data structures and an image.

FIG. 2, depicts one possible example of this relationship between samples and pixels of the image 270. Specifically, a single pixel 271 of the image 270 is depicted (not to scale), and depicted within the pixel 271 are the locations of four samples 272a-d. It should be noted that other embodiments are possible that employ fewer or greater numbers of samples per pixel. It should also be noted that despite the depiction of the four samples 272a-d in a rectangular arrangement that substantially aligns with the rectangular shape of the area of the pixel 271, other embodiments are possible in which the samples 272a-d may be positioned randomly within the rectangular area of the pixel 271, in a rectangular arrangement that is rotated relative to the rectangular shape of the pixel 271, or in any of a variety of other arrangements as will be familiar to those skilled in the art of sampling.

As also depicted in FIG. 2, corresponding to the one depicted pixel 271 of the image 270 is a pixel sample data 231 within the image sample data 230 and a pixel color data 276 within the final image data 275. To be clear, there are as many instances of the pixel sample data 231 within the image sample data 230, and there are as many instances of the pixel color data 276 within the final image data 275 as there are instances of the pixel 271 within the image 270. FIG. 2 is intended to depict the manner in which a single pixel 271 is related to data corresponding to it within the image sample data 230 and the final image data 275.

As further depicted in FIG. 2, the pixel sample data 231 includes four sample color indices 232a-d. The sample color indices 232a-d correspond to the samples 272a-d, respectively. The pixel sample data 231 also includes four color storage locations 236w-z. Although the quantity of four color storage locations (e.g., the color storage locations 236w, 236x, 236y and 236z) corresponds to the quantity of the samples 272a-d of the pixel 271, as will be explained in greater detail, there isn't necessarily a correspondence between individual ones of the color storage locations 236w-z and the samples 272a-d.

In some embodiments, the image sample data 230 may be organized among the memory devices of which the storage 260 is composed in a manner that defines a distinct area or "block" of storage locations within the storage 260 in which all of the sample color indices corresponding to all of the pixels are stored separately from the all of the color storage locations that correspond to all of those pixels in what may be called a memory "plane" made up solely of the sample color indices. Further, separate memory planes may also be defined within the storage 260 for the color storage locations 236w for all of the pixels, for the color storage locations 236x for all of the pixels, for the color storage locations 236y of all of the pixels, and for the color storage locations 236z of all of the pixels. However, it should be noted that other embodiments are possible in which a quantity of smaller blocks of storage locations within the storage 260 are defined that each correspond to one of the pixels of the image 270 in which all of the sample color indices and color storage locations for each pixel are separately co-located.

As the samples 272a-d are taken of primitives of the object(s) represented by the 3D model data 130 that are viewable from the perspective of the pixel 271 of the image 270, their colors (in a process that will shortly be explained in greater detail) are stored in one or more of the color storage locations 236w-z. Following completion of sampling for all of the pixels of the image 270, any of a variety of mathematical or other functions (e.g., averaging, weighted averaging, random selection, etc.) are performed on the color(s) stored within the color storage locations 236w-z to derive the final color that is given to the pixel 271, and a single color data value specifying that final color is stored in the pixel color data 276 in the final image data 275.

Returning to FIG. 1, with the colors for all of the pixels of the image 270 so derived, rendering of the image 270 is complete. In some embodiments, the processor circuit 250 may operate the display interface 285 to cause the image 270 to be visually displayed on the display 180. In other embodiments, the processor circuit 250 may signal the processor 150 to the effect that rendering of the image 270 is complete and may provide the final image data 275 that defines the image 270 to the processor circuit 150 to enable the processor circuit to, itself, visually present the image 270 on the display 180 and/or to transmit the final image data 275 via the network 999 to the other computing device 300, possibly for display on its display 380.

It should be noted that although FIG. 1 depicts an implementation of the computing device 1000 that incorporates two processor circuits (e.g., the processor circuits 150 and 250) that separately perform their respective tasks, other embodiments of the computing device 1000 are possible in which a single processor circuit performs all of these aforedescribed tasks. However, it is envisioned that the controller 200 incorporates a graphics system in which the processor circuit 250 may be somewhat specialized and/or optimized to perform tasks related to rendering, video decompression, image rescaling, etc., while the processor circuit 150 serves as a more general purpose processing circuit to execute an expected wider variety of instructions and tasks as directed by instructions of an operating system, one or more device drivers and/or one or more applications.

In various embodiments, each of the processor circuits 150 and 250 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may include a multi-core processor (whether the multiple cores coexist on the same or separate dies), and/or a multi-processor architecture of some other variety by which multiple physically separate processors are in some way linked.

In various embodiments, each of the storages 160 and 260 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 190 may employ any of a wide variety of signaling technologies enabling the computing device 1000 to be coupled to other devices as has been described. Each of these interfaces includes circuitry providing at least some of the requisite functionality to enable such coupling. However, this interface may also be at least partially implemented with sequences of instructions executed by the processor circuit 150 (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

In various embodiments, the display 180 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing device 1000, or may be disposed on a separate casing of a physically separate component of the computing device 1000 (e.g., a flat panel monitor coupled to other components via cabling).

Figure 3:
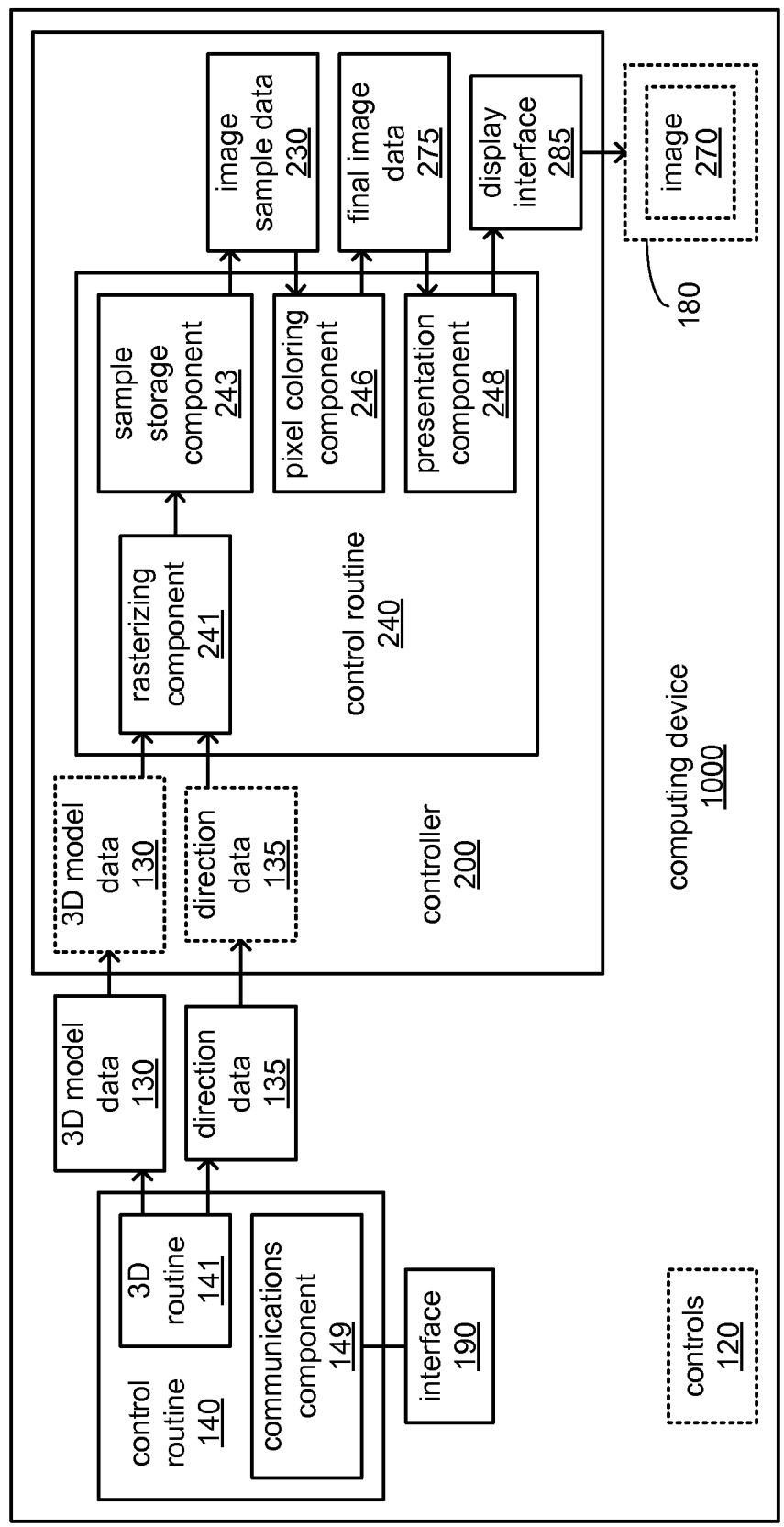
FIG. 3 illustrates a portion of the embodiment of FIG. 1.

FIG. 3 illustrates portions of the computing device 1000 of FIG. 1 in greater detail. More specifically, aspects of the operating environments of the processor circuits 150 and 250 executing respective ones of the control routine 140 and 240 to perform the aforedescribed functions are depicted. As will be recognized by those skilled in the art, each of the control routines 140 and 240, including the components of which each is composed, are selected to be operative on (e.g., executable by) whatever type of processor or processors that are selected to implement each of the processor circuits 150 and 250, respectively.

In various embodiments, the control routine 140 may include a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150 and 350, including without limitation, Windows™, OS X™, Linux®, or Android OS™. Where one or more device drivers are included, those device drivers may provide support for any of a variety of other components, whether hardware or software components, that include the computing devices 1000.

The control routine 140 includes a communications component 149 executable by the processor circuit 150 to operate the interface 190 to transmit and receive signals via the network 999 as has been described. As will be recognized by those skilled in the art, each of these communications components are selected to be operable with whatever type of interface technology is selected to implement each of the corresponding ones of these interfaces.

The control routine 140 includes a 3D routine 141 executable by the processor circuit 150 to maintain and/or manipulate the 3D model data 130 as possibly specified in commands conveyed via signals received by the processor circuit 150, possibly from the controls 120 and/or the network 999 via the interface 190. As previously discussed, the 3D model data 130 may represent any of a variety of types of objects from fictitious ones drawn as part of the play of a video game to real objects of which a human body may be composed. Thus, the 3D routine 141 may be a video game program, a CT (computed tomography) scan or MRI (magnetic resonance imaging) data viewing program, etc.

The control routine 240 includes a rasterizing component 241 to perform part of a rasterization-based rendering process to create the image sample data 230 via sampling of at least the graphics primitives (e.g., lines, triangles, polygons, etc.) of whatever objects are represented by the 3D model data 130. In the process, the rasterizing component derives the colors for each of the samples making up the image sample data 230. The control routine 240 also includes a sample storage component 243 that cooperates with the rasterizing component 241 to store the colors derived for the samples. As previously discussed, the controller 200 implements MSAA as an anti-aliasing technique, and thus, the color data values describing the colors of the samples of each pixel are stored in the image sample data 230 by the sample storage component 243 in a manner that allows the color of multiple samples of a pixel to be described with a single common color data value on occasions when those multiple samples have the same color.

Figure 4:
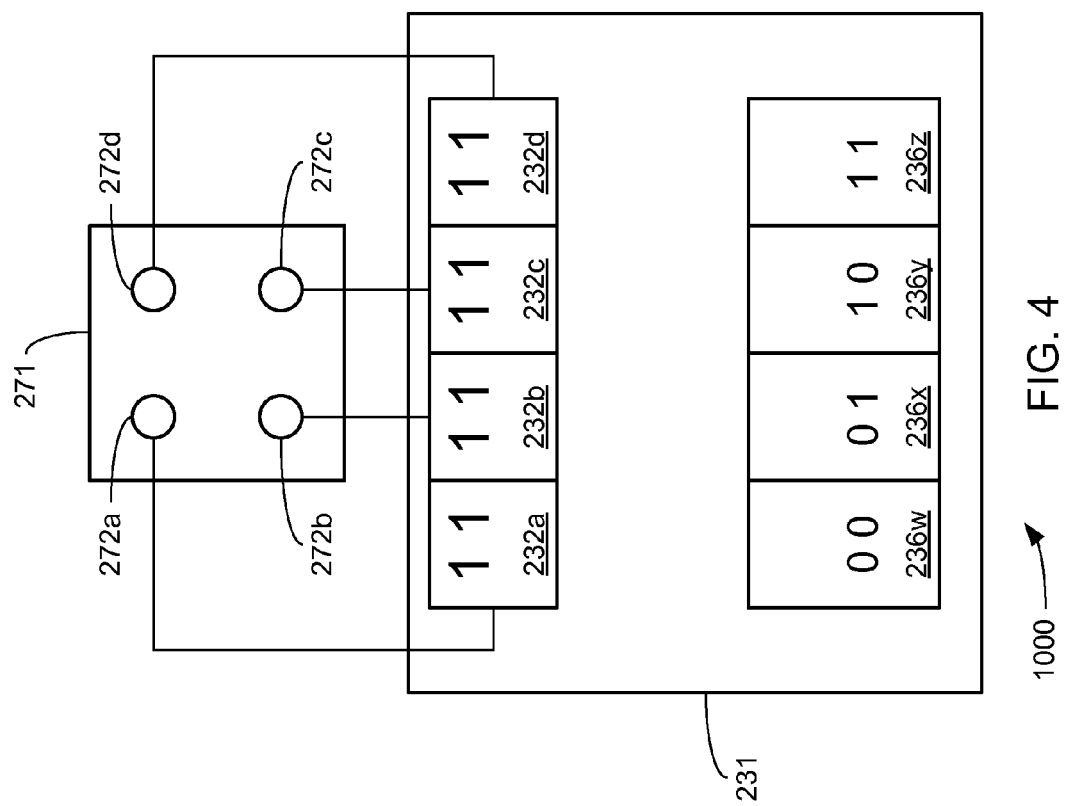
FIG. 4 illustrates a portion of the embodiment of FIG. 1 in an uncolored state.

FIG. 4 depicts further details of the manner in which color data values are stored for the previously discussed example of the samples 272a-d of the pixel 271 depicted in FIG. 2. As again depicted, the pixel sample data 231 corresponding to the pixel 271 includes the sample color indices 232a-d and the color storage locations 236w-z. As also graphically depicted, there is a 1-to-1 correspondence of the samples 272a-d and the sample color indices 232a-d, respectively. As will be explained and further depicted in greater detail, as the color of one or more of the samples 272a-d is derived by the rasterizing component 241, a color data value identifying that particular color is stored in one of the color storage locations 236w-z. Then the ones of the sample color indices 232a-d that correspond to the ones of the samples 272a-d for which that color has been derived are each caused to store a binary index value to point to that one of the color storage locations 236w-z in which the color data value of that particular color has been stored. In this way, a color derived as the color for multiple ones of the samples 272a-d (possibly all of the samples 272a-d) need be stored only once, thereby reducing bandwidth requirements in accessing the storage devices (e.g., memory devices) making up the storage 260.

The manner in which each of the sample color indices 232a-d may be caused to point to any one of the four color storage locations 236w-z is by being written with a binary index value specifying the binary-coded numeric identifier of one of the color storage locations 236w-z. As depicted, the sample color indices 232a-d each store a 2-bit binary index value (as a result of there being four of the color storage locations 236w-z), and those 2-bit binary index values may be concatenated to form a single 8-bit value (e.g., a byte value formed from a combination of the binary index values stored in each of the sample color indices 232a-d) such that these indices may be stored together in combined form within a portion of the storage 260 as a byte value. As depicted, the color storage location 236w is assigned the binary-coded numeric identifier 00, the color storage location 236x is assigned the binary-coded numeric identifier 01, the color storage location 236y is assigned the binary-coded numeric identifier 10, and the color storage location 236z is assigned the binary-coded numeric identifier 11.

The manner in which the pixel sample data 231 is initialized to an uncolored state in preparation for color data values to be stored is also depicted in FIG. 4. Instead of initializing the color storage locations 236w-z themselves (possibly, for example, by writing all 0's or some other initialization value into each), all four of the sample color indices 232a-d are initialized to all 1's, thereby reducing bandwidth requirements by obviating the need to initialize the color storage locations 236w-z (which may each be 24-bit, 32-bit or similarly wider binary values, depending on the color depth). The fact of all 1's throughout all of the bits of the sample color indices 232a-d indicating initialization to an uncolored state is due partially to a rule imposed by the sample storage component 243 in which the color storage locations 236w-z are always allocated starting with the color storage location 236w, then 236x, then 236y and then 236z. As a result, the first one of the color storage locations 236w-z to be allocated is always the one that is identified with a binary numeric value of 00. Given this, the presence of all 1's indicates that none of the color storage locations 236w-z have yet been allocated, which indicates that no color values for any of the samples 272a-d have yet been stored.

Given the rule that allocations must start with the color storage location 236w that is specified by a 00 binary index value, the presence of all 1's represents a combination of binary index values across all of the sample color indices 232a-d that cannot occur during the normal course of allocation of color storage locations to store color data values if any allocation of the color storage locations has been made. The processor circuit 250 is caused to make use of this otherwise meaningless (and thus, invalid) combination of all 1's for binary index values by employing this combination to encode an indication of the pixel sample data 231 having been initialized to an uncolored state. As is about to explained in greater detail, other combinations of binary index values that are also otherwise invalid given the aforedescribed rule of order of allocation are employed to indicate a partially colored state simultaneously with also indicating associations between different ones of the samples 272a-d and color data values stored in different ones of the color storage locations 236w-z. As will also be explained in greater detail, the fact of there being a valid or invalid combination of binary index values stored across all of the sample color indices 232a-d, along with other factors, is employed in determining how long to defer storing a color data value specifying a "clear" color in one of the color storage locations 236w-z.

Returning to FIG. 3, the control routine 240 includes a pixel coloring component 246 executable by the processor circuit 250 to derive the final colors for each pixel of the image 270 from the color data values stored in the image sample data 230 for the samples associated with each pixel. As previously discussed, various approaches may be employed to derive each pixel's final color, including and not limited to, averaging the color data values found among the samples of each pixel (possibly a weighted average), and random selection of a color data value from among those found among the samples of each pixel. Various other techniques for deriving pixel colors from the colors of their associated samples will be familiar to those skilled in the art. As the pixel coloring component 246 derives these colors, the pixel coloring component 246 stores color data values indicating the final colors of each pixel in the final image data 275, thus defining what is depicted in the image 270.

In some embodiments, the control routine 240 includes a presentation component 248 executable by the processor circuit 250 to operate the display interface 285 (if present) to drive the image 270, as defined in the final image data 275, onto the display 180, thereby visually presenting the image 270 on the display 180. Alternatively or additionally, the processor circuit 250 may provide the final image data 275 to the processor circuit 150 to enable the processor circuit 150 to transmit the final image data 275 to another computing device (e.g., the other computing device 300) or to enable the processor circuit 150 to perform the task of causing the image 270 to be visually presented on the display 180 in lieu of the processor circuit 250 doing so.

It is important to note that although this discussion has centered on the deriving of the single image 270 from the 3D model data 130, this should not be taken as suggesting that only one image is so derived. Stated differently, the image 270 may be but one frame of a stream of frames making up motion video in which every frame is derived from the 3D model data 130 in a similar manner. As those skilled in the art of rendering of such images will readily recognize, motion video simply involves repeating such a rendering process for each frame.

Figure 5B:
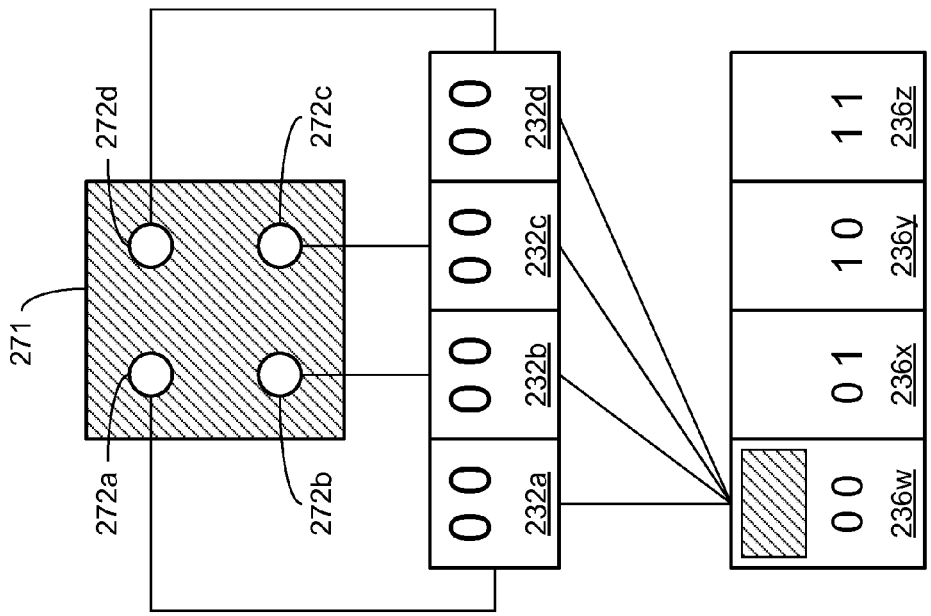
FIGS. 5a and 5b illustrate a portion of the embodiment of FIG. 1 in an uncolored state and in a fully colored state.
Figure 5A:
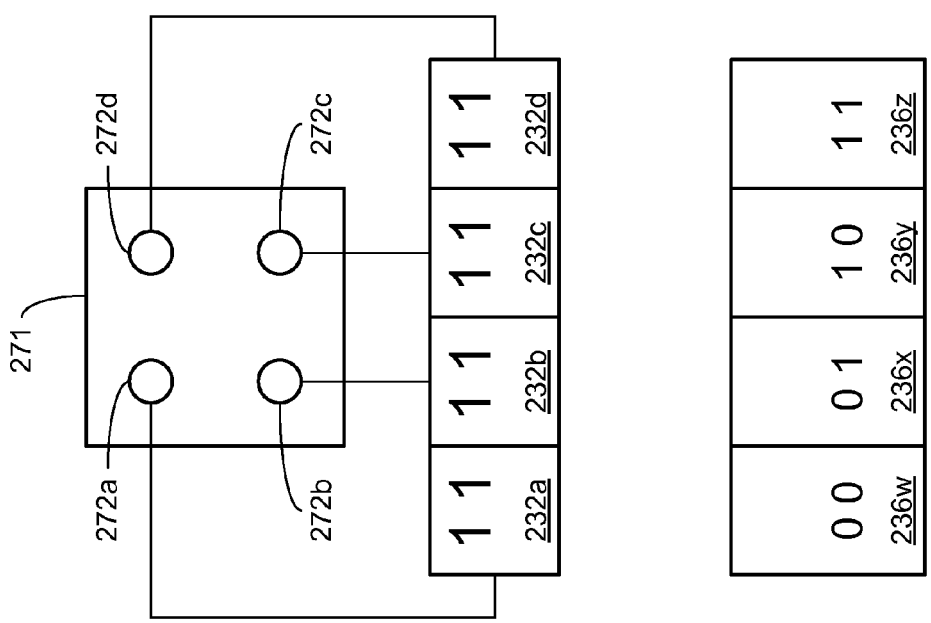

FIGS. 5a and 5b each depict the same portion of the computing device 1000 as depicted in FIG. 4, but at different stages of one example of storing color data values specifying colors for the samples of a pixel. In this example, a single color data value is stored that applies to all four of the samples 272a-d of the pixel 271.

Starting with FIG. 5a, in the manner previously described, the pixel sample data 231 is initialized to an uncolored state in preparation for the storing of color data values for one or more of the samples 272a-d by initializing all of the sample color indices 232a-d to all 1's. Again, this storing of all 1's to the concatenated 8 bits of the 2-bit sample color indices 232a-d as a mechanism of initialization requires less bandwidth in accessing portions of the storage 260 than does storing initial values (e.g., all 0's) in each of the color storage locations 236w-z.

As previously discussed, all four of the values of each of sample color indices 232a-d storing a pair 1's is a combination of binary index values among these four indices that normally cannot occur given the aforedescribed rule of the order in which the color storage locations 236x-z are allocated. Thus, this combination of binary index values is an invalid combination of binary index values that, as also previously discussed, is assigned to encode an indication of an uncolored state in which none of the color storage locations 236w-z has yet been allocated to store a color data value for any of the samples 272a-d. Such use of an otherwise invalid combination of binary index values as an indication of such an initialized state has the advantage of obviating the need to allocate at least one additional bit for the pixel sample data 231 (and accordingly, one additional bit apiece for every other pixel throughout the image sample data 230) to provide an indication of this initialized state.

Turning to FIG. 5b, the processor circuit 250 has been caused via the sample storage component 243 to store a single color data value that specifies a color derived by the rasterizing component 241 and determined to be common to all four of the samples 272a-d. In so doing, the processor circuit 250 has been caused to store the color data value of this one common color in the color storage location 236w, which as has been explained is always the first of the color storage locations 236w-z to be allocated. The processor circuit 250 has also been caused to store binary index values of 00 in each of the sample color indices 232a-d, thereby causing all four of the sample color indices 232a-d to point to the color storage location 236w (which is identified by the binary code 00, as depicted). In other words, all four of the sample color indices 232a-d are caused to indicate that the color data value specifying the color for their corresponding ones of the samples 272a-d, respectively, has been stored in the color storage location 236w.

The presence of all 0's across all of these indices is an entirely valid value. It comports with the rule that the color storage location identified by the binary index value of 00 must always be allocated first (e.g., the color storage location 236w). Also, and as is about to be explained in greater detail, the presence of a binary index value of 00 in at least one of the sample color indices 232a-d leading to creating a valid combination is also assigned to encode an indication of the pixel sample data 231 having been set to a fully colored state in which every one of the samples 272a-d has been associated with a color data value. Thus, the presence of a binary index value of 00 in any of the sample color indices 232a-d is given dual simultaneous meanings.

Figure 6B:
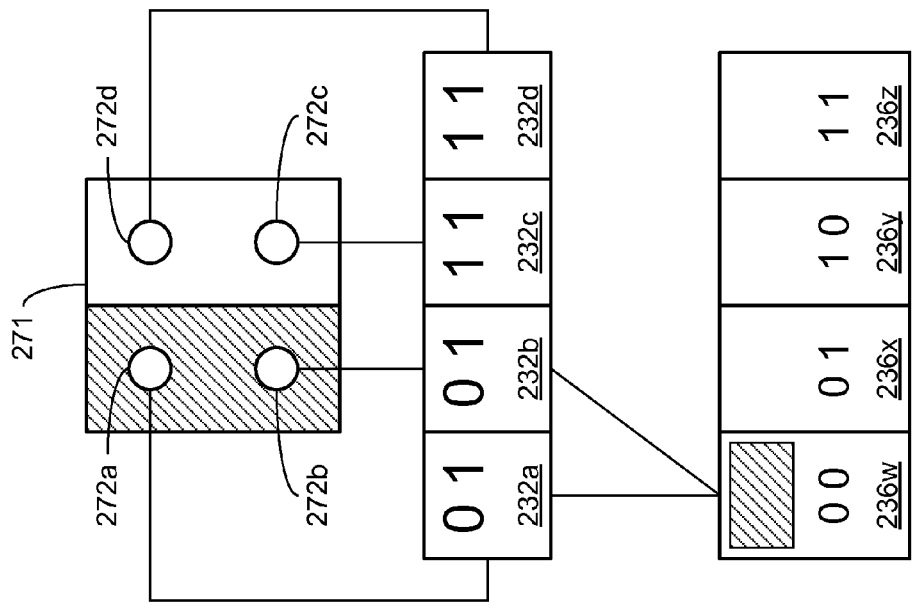
Figure 6A:
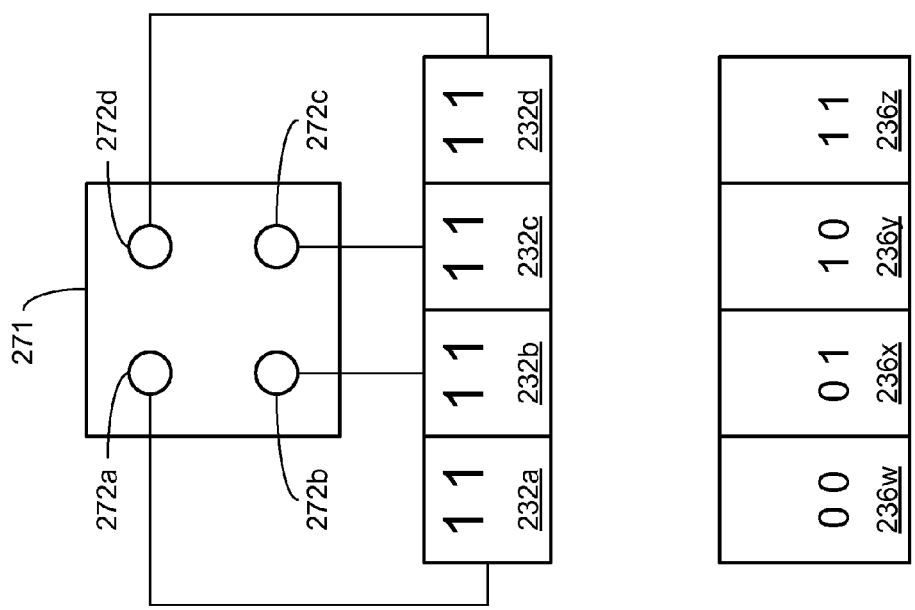

FIGS. 6a, 6b and 6c each depict the same portion of the computing device 1000 as depicted in FIG. 4, but at different stages of another example of storing color data values specifying colors for the samples of a pixel. In this example, a pair of color data values are stored, one at a time, each of which applies to two of the samples 272a-d of the pixel 271.

Starting with FIG. 6a, again, the pixel sample data 231 is initialized to an uncolored state in preparation for the storing of color data values by initializing all of the sample color indices 232a-d to all 1's. Again, the presence of all 1's is an otherwise invalid combination of binary index values that is used to encode an indication that the pixel sample data 231 has been initialized to an uncolored state.

Turning to FIG. 6b, the processor circuit 250 has been caused via the sample storage component 243 to store a first color data value that specifies a color derived by the rasterizing component 241 and is determined to apply to the samples 272a and 272b. In so doing, the processor circuit 250 has been caused to store this first color data value of this color in the color storage location 236w, the color storage location that is always the first to be allocated.

However, instead of storing binary index values of 00 in each of the sample color indices 232a and 232b as would be expected to accurately indicate that the color data value associated with the samples 272a and 272b, respectively, is stored in the color storage location 236w, binary index values of 01 are stored in each of the sample color indices 232a and 232b. This results in another invalid combination of binary index values, since the first instance of an allocation of a color storage location should result in at least one of the sample color indices 232a-d storing a binary index value of 00. Thus, according to the aforementioned rule of the order of allocation of color storage locations, the lowest binary index value among all four of the binary index values stored in the sample color indices should be a value of 00.

Referring back to the earlier discussion of FIG. 5b, the presence of the binary index value of 00 in at least one of the sample color indices 232a-d leading to the creation of a valid combination is assigned to encode an indication of the pixel sample data 231 having been set to a fully colored state in which every one of the samples 272a-d has been associated with a color data value. However, so far in this example in FIG. 6b, only the samples 272a and 272b have been associated with any color data value. Therefore, the pixel sample data 231 is not yet in a fully colored state. Instead, the pixel sample data 231 has been placed into a partially colored state in which the samples 272c and 272d have as yet to be associated with any color data value.

Thus, the processor circuit 250 is caused by the sample storage component 243 to simultaneously indicate that the samples 272a and 272b have been given the color described with the color data value stored in the color storage location 236a and indicate that the pixel sample data 231 has been set to a partially colored state by adding a binary value of 01 to the binary index value of 00 that would normally be stored in each of the sample color indices 232a and 232b, respectively. The result, as discussed, is that the lowest binary index value in all of the sample color indices 232a-d is 01, and not 00. It is, specifically, the presence of the binary index value of 01 as the lowest of the binary index values in any of the sample color indices 232a-d (which leads to creating an invalid combination) that provides the encoded indication of the partially colored state. This indication of the partially colored state is also taken as an indication that the real binary index values indicating which of the color storage locations stores the color data value assigned to the samples 272a and 272b must be derived by subtracting the binary value of 01 from the binary index value 01 stored in each of the sample color indices 232a and 232b. This subtraction results in the accurate identification of the color storage location 236w with the derived binary value of 00.

Another feature of the partially colored state is that a binary index value of 11 in any of the sample color indices 232a-d continues to be interpreted as indicating that its associated one of the samples 272a-d has not yet been assigned a color data value. This is not unlike the interpretation given to this same binary index value of 11 being present in all of the sample color indices 232a-d, though the presence of the binary index value of 11 in all of the color indices 232a-d also encodes an indication of an uncolored state. Thus, the binary index value of 01 in each of the sample color indices 232a-b is interpreted (via subtraction by a binary value of 01) to point to the color storage location 236w as storing a color data value assigned to the samples 272a-b, while the binary index value of 11 in each of the sample color indices 232c-d is interpreted as indicating that neither of the samples 272c-d have been assigned a color.

Returning briefly to the earlier example of FIGS. 5a and 5b, a transition was made in that example directly from a uncolored state to a fully colored state since the one color data value that was stored in the color storage location 236w in that example was applied to all four of the samples 272a-d. Thus, there was never an instance in that example of less than all of the samples 272a-d being associated with a color data value. This is why invalid combinations of binary index values in which the lowest binary index value is a 01 never occurred in that example.

Turning to FIG. 6c, the processor circuit 250 has been caused via the sample storage component 243 to store a second color data value that specifies another color derived by the rasterizing component 241 and this time determined to apply to the samples 272c and 272d. In so doing, the processor circuit 250 has been caused to store this second color data value in the next color storage location to be allocated in accordance with the aforedescribed rule of order of allocation of color storage locations, namely the color storage location 236x.

With the storage of this second color data value in the color storage location 236x, all four of the samples 272a-d are now each assigned a color, and therefore, the pixel sample data 231 is now placed in a fully colored state. As previously discussed, the fact of the pixel sample data 231 being in the fully colored state is assigned to be indicated through the use of binary index values in the sample color indices 232a-d that accurately identify the ones of the color storage locations 236w-z storing color data values associated with each of the samples 272a-d. More specifically, the fully colored state is indicated with at least one of the sample color indices 232a-d storing a binary index value of 00 identifying the color storage location 236w such that 00 is the lowest binary value among these indices.

Thus, in switching from indicating a partially colored state to a fully colored state, the processor circuit 250 is caused by the sample storage component 243 to modify the binary index values stored in each of the sample color indices 232a and 232b from 01 to 00 to accurately point to the color storage location 236w (without the use of subtraction by binary 01 as done while in the partially colored state). The processor circuit 250 is also caused by the sample storage component 243 to store the value 01 in each of the sample color indices 232c and 232d to point to the color storage location 236x (also without the use of subtraction by binary 01). In so doing, the processor circuit 250 is caused to create a valid combination of binary index values across all of the sample color indices 232a-d.

FIGS. 7a, 7b, 7c and 7d each depict the same portion of the computing device 1000 as depicted in FIG. 4, but at different stages of still another example of storing color data values specifying colors for the samples of a pixel. In this example, four color data values are stored, one at a time, each of which applies to one of the samples 272a-d of the pixel 271. Further, one of the color data values specifies a "clear" color.

Starting with FIG. 7a, again, the pixel sample data 231 is initialized to an uncolored state in preparation for the storing of color data values by initializing all of the sample color indices 232a-d to all 1's. Again, the presence of all 1's is an otherwise invalid combination of binary index values that is used to encode an indication that the pixel sample data 231 has been initialized to an uncolored state.

Figure 7B:
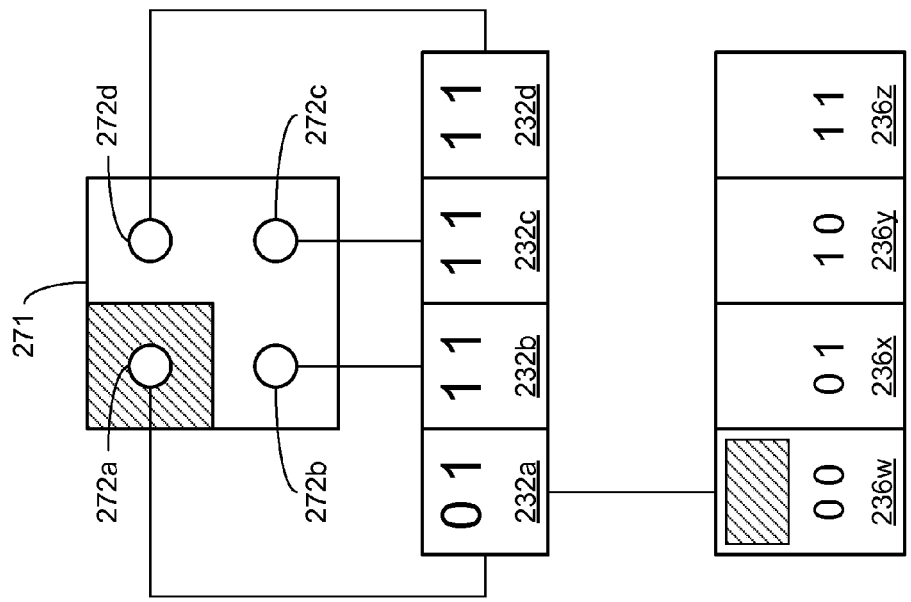
FIGS. 7a, 7b, 7c and 7d illustrate a portion of the embodiment of FIG. 1 in an uncolored state, in various partially colored states and in various fully colored states.
Figure 7A:
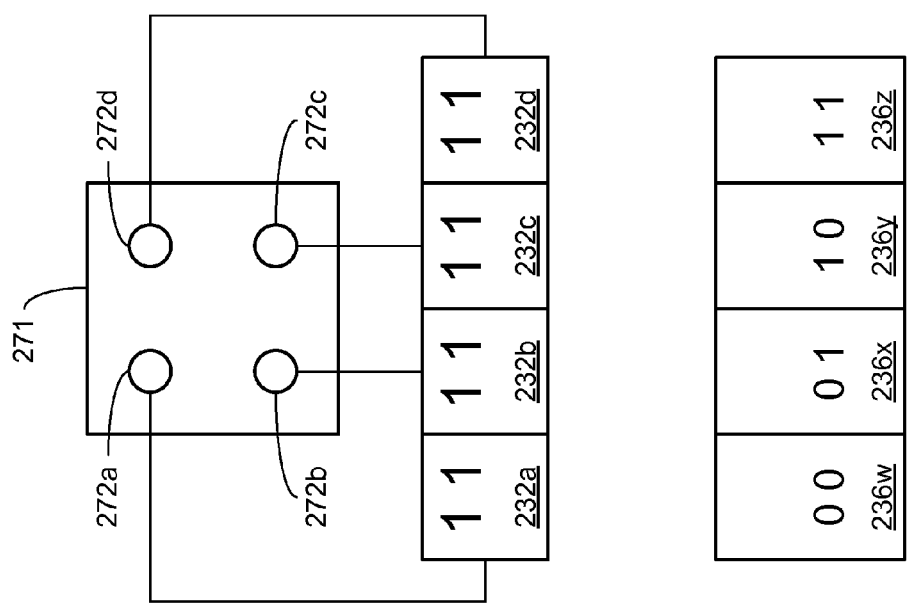

Turning to FIG. 7b, the processor circuit 250 has been caused via the sample storage component 243 to store a first color data value that specifies a color derived by the rasterizing component 241 and determined by the rasterizing component 241 to apply only to the sample 272a. In so doing, the processor circuit 250 has been caused to store this first color data value of this color in the color storage location 236w, which is the color storage location that is always the first to be allocated.

Given that this results in only the sample 272a being assigned a color data value, the pixel sample data 231 is now in a partially colored state. As a result, to both indicate this partially colored state and to indicate that the color data value stored in the color storage location 236w is the one assigned to the sample 272a, a binary index value of 01 is stored in the sample color index 232a. As previously discussed, and as depicted in FIG. 7b, this results in the lowest binary index value stored in any of the sample color indices 232a-d being a binary 01, and this results in subtraction by a binary value of 01 of any of the binary index values stored in any of the sample color indices 232a-d that points to a color storage location being required to derive the correct numeric identifier of one of the color storage locations 236w-z. Thus, for the binary index value of 01 in the sample color index 232a to be correctly interpreted as pointing to the color storage location 236w, this binary index value of 01 must be subtracted by the binary value of 01 (thereby arriving at the binary index value of 00 that matches the numeric identifier of the color storage location 236w).

Also, the partially colored mode again results in the binary index value of 11 in any of the sample color indices 232a-d continuing to be interpreted as indicating that its associated one of the samples 272a-d has not yet been assigned a color data value. Thus, the binary index value of 11 in each of the sample color indices 232b-d is interpreted as indicating that none of the samples 272b-d have yet been assigned a color data value.

Figure 7D:
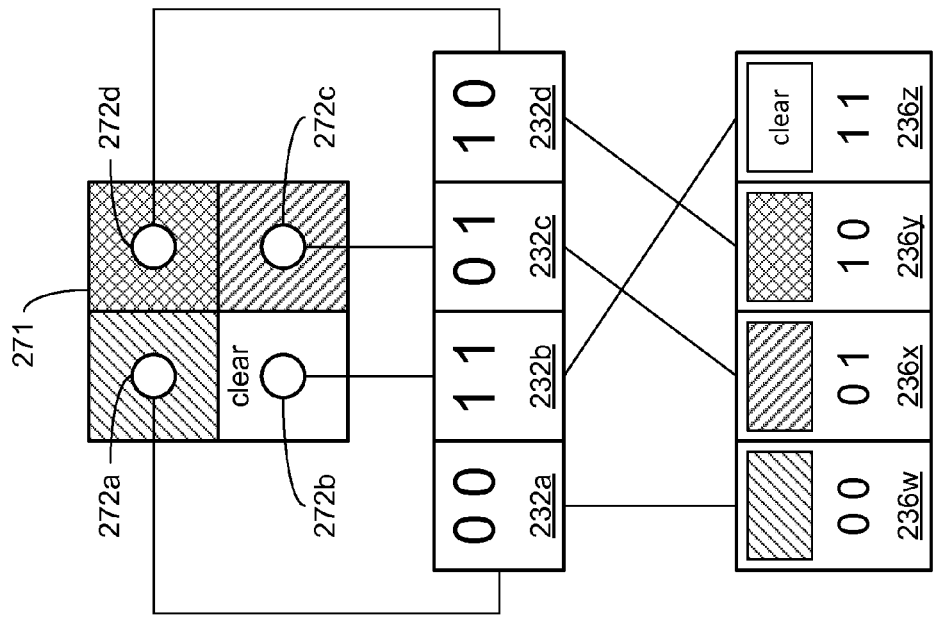
Figure 7C:
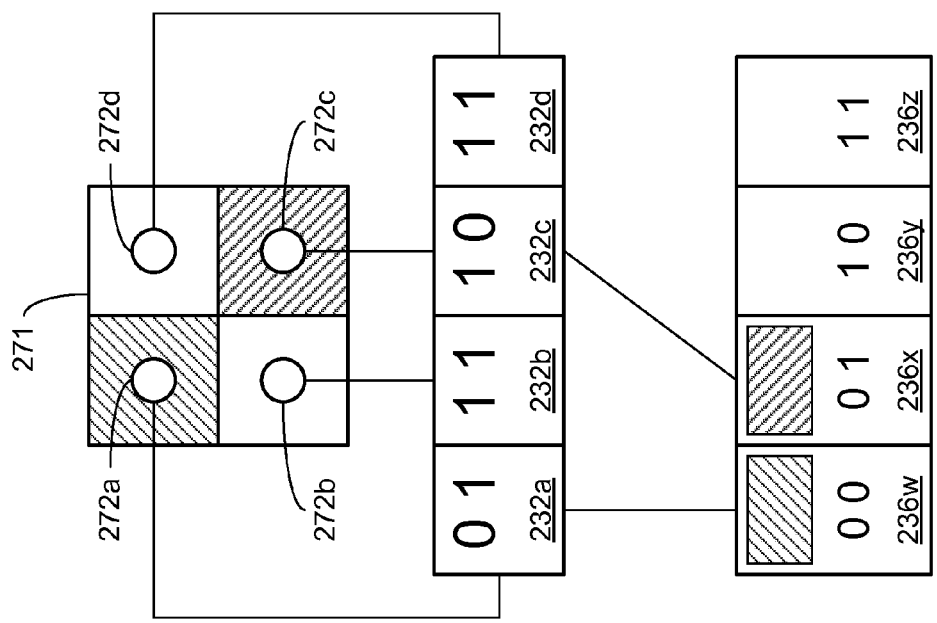

Turning to FIG. 7c, the processor circuit 250 has been caused via the sample storage component 243 to store a second color data value that specifies another color derived by the rasterizing component 241 and this time determined to apply only to the sample 272c. In so doing, the processor circuit 250 has been caused to store this second color data value in the next color storage location available to be allocated in accordance with the aforedescribed rule of order of allocation of color storage locations, namely the color storage location 236x.

Given that this results in only the samples 272a and 272c being assigned color data values, the pixel sample data 231 remains in a partially colored state. To continue to both indicate this partially colored state and to indicate that the color data value stored in the color storage location 236w is the one assigned to the sample 272c, a binary index value of 10 is stored in the sample color index 232c. Again, the lowest binary index value stored in any of the sample color indices 232a-d remains the binary index value 01 stored in the sample color index 232a, and again, this provides the indication of the pixel sample data 231 still being in a partially colored state. Also again, subtraction by a binary value of 01 continues to be required to derive the correct numeric identifier of any of the color storage locations 236w-z pointed to by any of the binary index values stored in one of the sample color indices 232a-d that is interpreted as pointing to one of the color storage locations 236w-z. Thus, for the binary index value of 10 in the sample color index 232c to be correctly interpreted as pointing to the color storage location 236x, this binary index value of 10 must be subtracted by the binary value of 01 (thereby arriving at the binary index value of 01 that matches the numeric identifier of the color storage location 236x).

Also, the binary index value of 11 in any of the sample color indices 232a-d continues to be interpreted as indicating that its associated one of the samples 272a-d has not yet been assigned a color data value. Thus, the binary index value of 11 in each of the sample color indices 232b and 232d is interpreted as indicating that neither of the samples 272b or 272d have yet been assigned a color data value.

Turning to FIG. 7d, the processor circuit 250 has been caused via the sample storage component 243 to store a third color data value that specifies still another color derived by the rasterizing component 241 and this time determined to apply only to the sample 272d. In so doing, the processor circuit 250 has been caused to store this third color data value in the next color storage location available to be allocated in accordance with the aforedescribed rule of order of allocation of color storage locations, namely the color storage location 236y.

Given that this results in the samples 272a and 272c-d, but not the sample 272b, being assigned color data values, the pixel sample data 231 would remain in a partially colored state. However, in storing this third color data value in the color storage location 236y, the next-to-last of the color storage locations has now been allocated, and in response to this, the processor circuit 250 is caused by the sample storage component 243 to also store a color data value for a "clear" color in the color storage location 236z (the color storage location that is always last to be allocated). This actually results in the sample 272b also being assigned a color, which results in the pixel sample data 231 now transitioning to a fully colored state. It is the use of the next-to-last of the color storage locations (specifically, color storage location 236y, in this example) where still not all of the samples 272a-d have been assigned colors that triggers this storing of a color data value for a "clear" color in the last color storage location.

Upon this transition to a fully colored state, the combinations of binary index values in all of the sample color indices 232a-d are expected to be valid values in which the binary index values of each of the sample color indices 232a-d correctly identify one of the color storage locations 236w-z (e.g., the binary index values stored in each of the sample color indices 232 actually match the numeric identifiers of the ones of the storage locations 236w-z to which they point such that subtraction by binary 01 to derive correct numeric identifiers is no longer necessary). Thus, in this transition to a fully colored state, the processor circuit 250 is further caused by the sample storage component 243 to modify the binary index values stored in the sample color indices 232a and 232c to point to the color storage locations 236w and 236x, respectively, using correct binary index values, instead of using binary index values requiring subtraction by binary 01 to derive the correct binary index values that match the numeric identifiers. So, the binary index value 01 stored in the sample color index 232a is replaced with the binary index value 00, and the binary index value 10 stored in the sample color index 232c is replaced with the binary index value 01. By so doing, the binary index value 10 becomes available for use in the sample color index 232d to correctly indicate that the color data value assigned to the sample 272d is stored in the color storage location 236y. The sample color index 232b continues to store the binary index value 11, however, upon entry into the fully colored mode, the binary index value 11 is now interpreted as pointing to the color storage location 236z.

In some embodiments, the "clear" color, for which a color data value has been stored in the color storage location 236z, may be a background color to be given used in regions of the image 270 in which no part of any object represented by the 3D model data 130 is shown. In other embodiments, the clear color may not be a real color, at all, but may simply be a color data value that provides an indication to another component of control routine 240 (not shown) of the need to derive a background or other color for one or more samples of a pixel and/or one or more pixels that does not show a part of any object represented by the 3D model data. This may be the case where the background color is not a single uniform color.

A feature of the partially colored state is that the storing of a "clear" color is at least deferred, if not avoided altogether. This improves upon other implementations of MSAA in which the storing of any color data value in any of the color storage locations 236w-z would also be immediately accompanied by a color data value for a "clear" color being stored in the next available one of the color storage locations 236w-z for use in assigning that clear color to any of the samples 272a-d that is not already assigned a color. In other words and returning to FIG. 6b, in those other implementations of MSAA, the storing of a color data value in the color storage location 236w and its assignment to the samples 272a and 272b would be immediately accompanied by the storage of a clear color in the color storage location 236x and its assignment to the samples 272c and 272d. However, this would then be rendered a superfluous act by the assignment of a color to those very same samples 272c and 272d later in FIG. 6c. Thus, some of the available bandwidth for accessing memory devices of the storage 260 would have been wasted to store the color value data for that "clear" color so soon. By deferring the storage of a clear color during the partially colored state at least until the next-to-last color storage location is used to store a color data value derived by the rasterizing component 241, as shown in FIG. 7d, the opportunity is provided to entirely avoid ever making accesses to the storage 260 to store a clear color in instances where all of the samples 272a-d are assigned color data values derived by the rasterizing component 241. Such deferment of storing a color data value for a clear color can avoid wasting a considerable amount of bandwidth when done across the many pixels making up the image 270. For example, had the color data value stored in the color storage location 236y (as shown in FIG. 7d) been assigned to both of the samples 272b and 272d, then the storage of a color data value for a clear color would have been entirely avoided, since all of the samples 272a-d would have been assigned colors derived by the rasterizing component 241. Such avoidance of ever storing a color data value for a clear color can also provide further benefits at later stages in the rendering of the image 270 inasmuch as stored copies of the color data value for a clear color that are ultimately superfluous are not present among the color storage locations 236w-z to be accessed for retrieval and then stored again.

Summarizing from the examples of FIGS. 5a-b, FIGS. 6a-c and FIGS. 7a-7d, a rule of order of allocation of color storage locations is imposed that results in a subset of possible combinations of binary index values in sample color indices being defined as possible (and therefore, valid) and results in another subset of possible combinations of binary index values being defined as not possible (and therefore, invalid). One of the invalid combinations is selected to encode an indication that pixel sample data for a pixel has been initialized to an uncolored state in which none of the samples associated with that pixel have yet been assigned a color. In the above examples, the combination of binary index values for the sample color indices 232a-d resulting in all 1's was selected to encode this indication.

A number of the other invalid combinations are employed to simultaneously encode an indication of the pixel sample data of that pixel having been placed into a partially colored state as a result of less than all of the samples being assigned a color derived by rasterization, and encode indications identifying what color storage locations store color data values that apply to one or more of the samples. In the encodings of indications identifying color storage locations, binary index values that match the numeric identifiers to correctly identify the color storage locations to which they point are not used in order to avoid creating valid combinations of binary index values. Instead, the binary index values stored in the sample color indices are selected to require an arithmetic operation to derive binary index values that match the numeric identifiers of the color storage locations to which they point. In the above examples, the binary index values stored in the sample color indices 232a-d to point to one or more of the color storage locations 236w-z were selected to require subtraction by a binary value of 01 to derive the correct identifying binary index values.

Also, during the partially colored state, though there may be one or more of the samples that have been assigned a color derived by rasterization, none of the samples have been assigned a clear color. Indeed, the storage of a color data value denoting a clear color is deferred during the partially colored state (at least until the next-to-last color storage location is allocated) to allow for the possibility that there will be no need to ever store such a color data value, since it remains possible that the next color data value stored for a color derived from rasterization may be applied to all of the samples that have not yet been assigned a color. In this way, an effort is made to avoid wasting memory bandwidth by making a memory access to store a color data value for a clear color that may subsequently be rendered unnecessary, as well as avoiding causing later unnecessary accesses to that unnecessary color data value in later stages of the rendering pipeline.

The storage of a color data value derived by rasterization into the next-to-last color storage location (as dictated by the rule of order of allocation of the color storage locations) triggers a transition from a partially colored state to a fully colored state that can be performed in one of two ways—either with the storage of a color data value specifying a clear color into the last color storage location, or not. Where the color data value stored in the next-to-last color storage location is to be applied to all of the samples that have not yet been assigned a color, a color data value of a clear color is not stored. Thus, having been deferred throughout the partially colored state, the result is a refraining from storing a color data value for a clear color. However, where the color data value stored in the next-to-last storage location will not be applied to all of the samples that have not yet been assigned a color such that there will still be at least one sample still not assigned a color, the deferring of storing a color data value for a clear color throughout the partially colored state ends amidst this transition. The last color storage location is used to store a color data value for a clear color, and whatever ones of the sample color indices that correspond to whatever samples that have still not been assigned a color are provided a binary index value pointing to the last color storage location where the color data value for the clear color is now stored.

In this transition, from a partially colored state to a fully colored state, binary index values already stored in the sample color indices are examined to determine what samples have already been assigned color(s) derived by rasterization. This is taken into account along with what samples will now be assigned the color specified by the color data value now being stored in the next-to-last color storage location. If it is determined that there will still remain one or more samples still not assigned a color derived by rasterization, then storage of a color data value for a "clear" color in the last color storage location is triggered.

In this transition, regardless of whether storage of a color data value for a clear color is triggered, or not, binary index values already stored in any of the sample color indices and that point to a color storage location are converted from binary index values requiring an arithmetic operation to derive correct binary index values to binary index values that correctly identify those color storage locations. In other words, those binary index values are altered so that they match the numeric identifiers of the color storage locations to which they point. The sample color indices that correspond to the samples to which the color specified by the color data value being stored in the next-to-last color storage location applies are then written with a binary index value that points to the next-to-last color storage location and matches the numeric identifier of the next-to-last color storage location. If a clear color is triggered to be applied to any of the samples, then the sample color indices corresponding to those samples are written with a binary index value that points to the last color storage location and matches the numeric identifier of the last color storage location. Either with or without storage of a color data value specifying a clear color, the sample color indices now together store a valid combination of binary index values. As previously discussed, all valid combinations of binary index values indicate both the color storage locations that store color data values identifying colors that apply to each of the samples, and that the pixel sample data has transitioned to a fully colored state.

It should be noted that despite the depiction and discussion of specific binary values as assigned to encode specific meanings, the depiction and discussion of color storage locations allocated in a manner in which their numeric identifiers increment with each such allocation, and the depiction and discussion of a subtraction by a specific binary value, these are arbitrarily chosen binary and numeric values. Thus, alternate embodiments are possible in which color storage locations are allocated in a manner in which their numeric identifiers decrement with each allocation and/or the invalid combination of binary index values assigned to encode an indication of an uncolored state is all 0's, instead of all 1's.

Figure 8A:
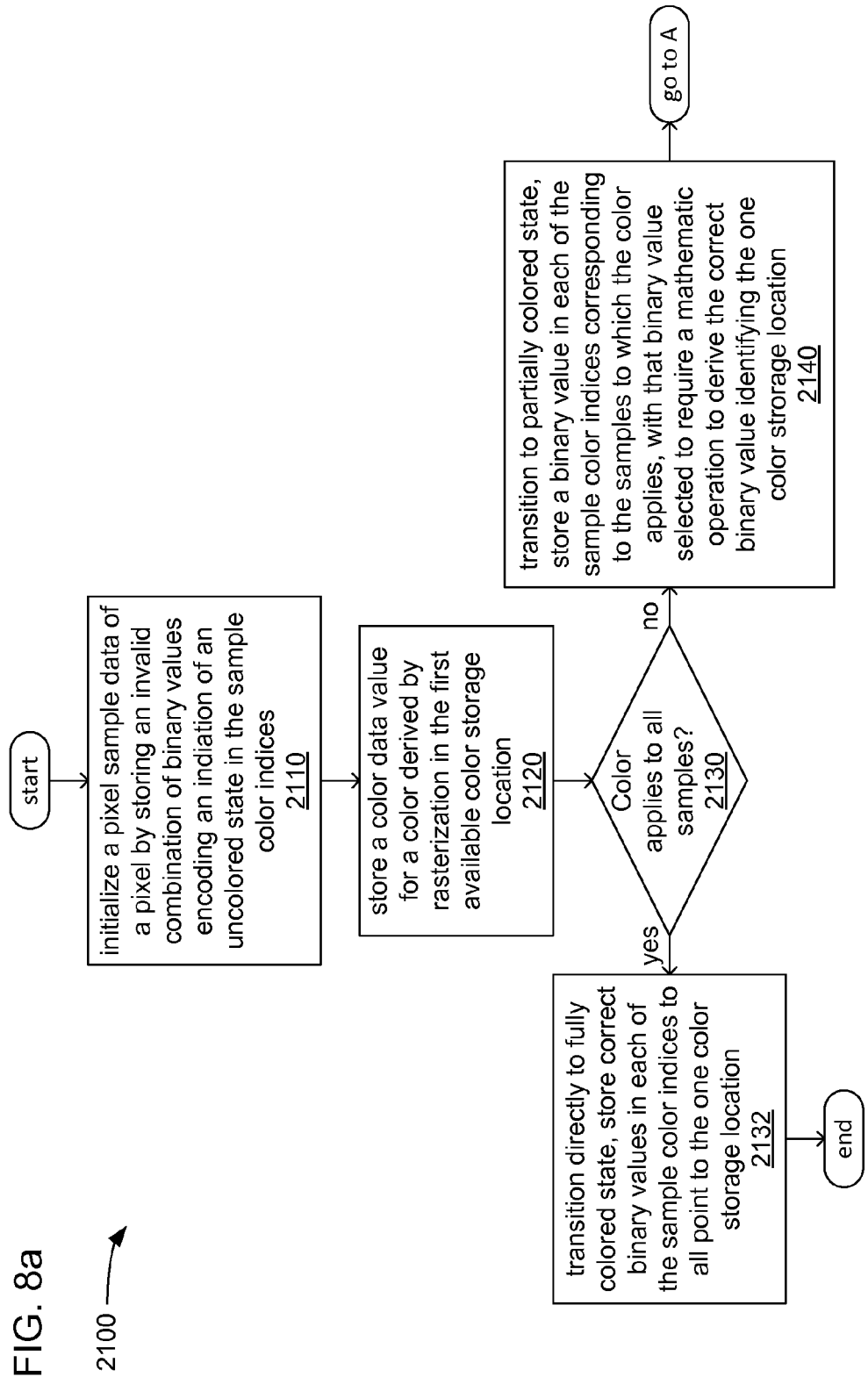
FIGS. 8a and 8b illustrates an embodiment of a first logic flow.
Figure 8B:
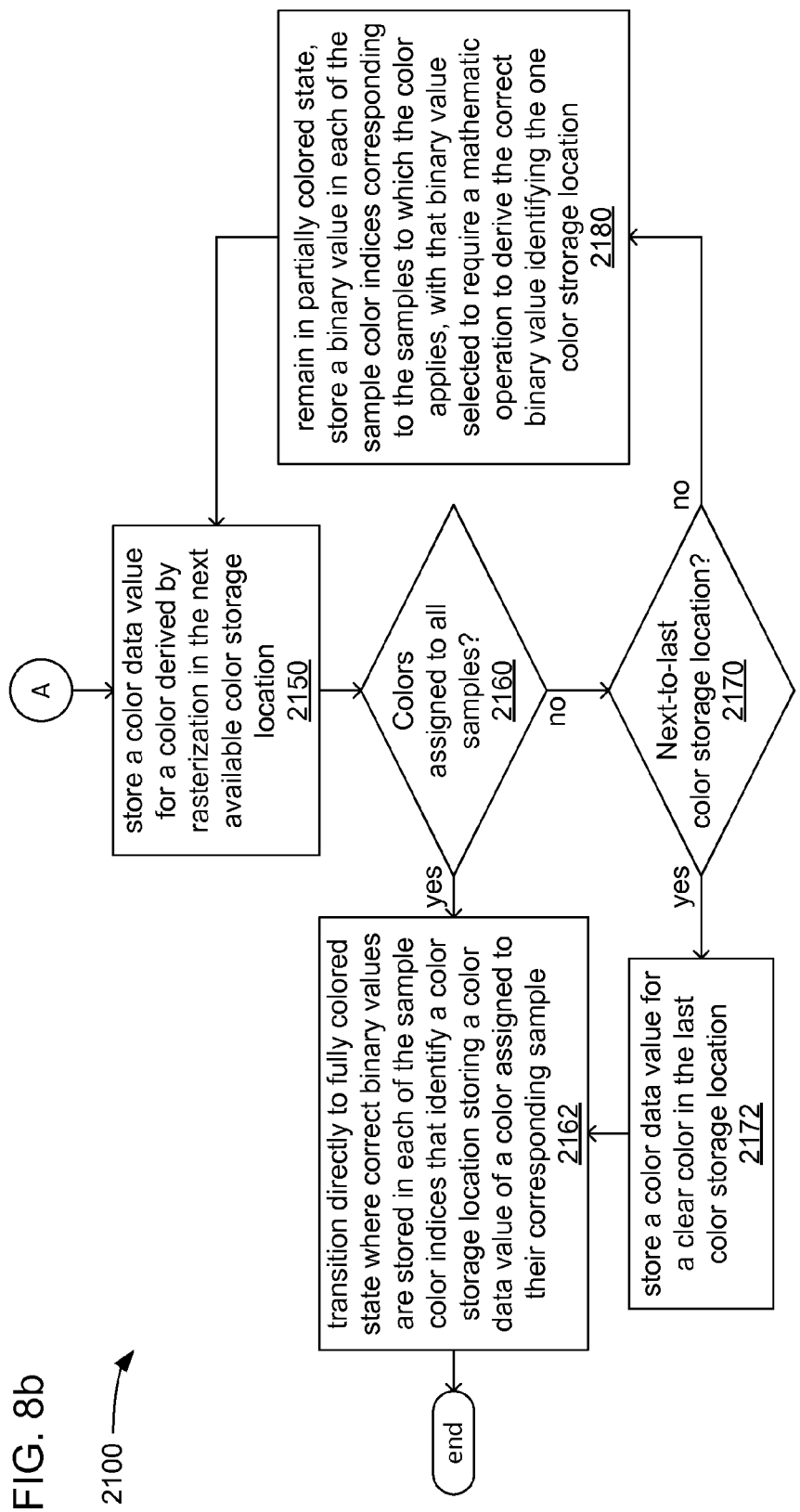

FIGS. 8a and 8b, together, illustrate an embodiment of a logic flow 2100. The logic flow 2100 may be representative of some or all of the operations executed by one or more embodiments described herein. More specifically, the logic flow 2100 may illustrate operations performed by at least the processor circuit 250 of the controller 200 in executing at least the control routine 240.

At 2110, a controller (e.g., the controller 200) rasterizing an image (e.g., the image 270) of objects represented by 3D model data (e.g., the 3D model data 130) initializes a pixel sample data corresponding to a pixel of the image (e.g., the pixel sample data 231 of the image sample data 230 corresponding to the pixel 271 of the image 270) by storing an invalid combination of binary index values that have been assigned to encode an indication of an uncolored state in the sample color indices of that pixel sample data (e.g., the sample color indices 232a-d of the pixel sample data 231) in which no color has yet been assigned to any sample of that pixel (e.g., the samples 272a-d). As has been discussed, such sample color indices are part of implementing the MSAA variant of anti-aliasing, and in allocating color storage locations to store color data values in MSAA, a rule is imposed in which those color storage locations are always allocated in a selected order. As a result, some combinations of binary index values that may be stored in the sample color indices are invalid since they should not occur as a result of the imposition of the rule of ordering of allocation of color storage locations.

At 2120, a color data value for a color derived by rasterization of object(s) represented by the 3D model data is stored in the first available color storage location (e.g., the color storage location 236w). As has been discussed, the imposition of the rule of ordering of allocation of color storage locations dictates a particular one of the color storage locations that is always allocated first, such as the color storage location 236w in the above examples.

At 2130, a check is made as to whether this color applies to all of the samples of the pixel. If so, then the pixel sample data is transitioned to a fully colored state at 2132. Binary index values are stored in each of the sample color indices, with each of those binary index values correctly identifying the first available color storage location as the color storage location in which the color data value of this color is stored such that a mathematic operation is not required to derive the identity of the first available color storage location. As has been discussed, the use of such correct binary index values results in a combination of binary index values that is valid, given the imposed rule, and the fact of this combination being a valid combination encodes an indication that the pixel sample data has been placed into a fully colored state.

However, if the color does not apply to all of the samples of the pixel, then the pixel sample data is transitioned to a partially colored state, and a binary index value is stored in each of the sample color indices corresponding to the samples to which the color does apply at 2140, with the binary index value being selected to require a mathematic operation to derive the correct binary index value that identifies the first available color storage location. As has been discussed, such a binary index value is used to intentionally create an invalid combination of binary index values stored in the sample color indices that is assigned to encode an indication that the pixel sample data has been placed into a partially colored state.

At 2150, a color data value for another color derived by rasterization of object(s) represented by the 3D model data is stored in the next available color storage location (e.g., the color storage location 236w). As has been discussed, the imposition of the rule of ordering of allocation of color storage locations dictates which of the color storage locations that has not yet been employed to store a color data value is the next one to be allocated to store color data value.

At 2160, a check is made as to whether colors have now been assigned to all of the samples of the pixel. If so, then the pixel sample data has transitioned to a fully colored state at 2162. A binary index value is stored in each of the sample color indices corresponding to the samples to which this latest color applies that correctly indicates the identity of the color storage location into which the color data value of this latest color was just stored. Further, all other binary index values in the other sample color indices that are meant to point to other color storage locations are replaced with correct binary index values to identify those other color storage locations (by matching the numeric identifiers of those other color storage locations) such that a mathematic operation is not required to derive those correct binary index values. As has been discussed, the use of such correct binary index values results in a combination of binary index values that is valid, given the imposed rule, and the fact of this combination being a valid combination encodes an indication that the pixel sample data has been placed into a fully colored state.

However, if less than all of the samples now have colors assigned to them, then at 2170, a check is made as to whether the color storage location just allocated to store the color data value of this latest color is the next-to-last color storage location (as dictated by the rule imposing an order of allocation of color storage locations). If so, then a color data value for a clear color is stored in the last color storage location at 2172, and a binary index value matching the numeric identifier of the last storage location is stored each of the sample color indices corresponding to a sample to which the clear color is to apply. This transitions the pixel sample data to a fully colored state at 2162, where the binary index values stored in the other sample color indices pointing to other color storage locations are replaced with correct binary index values, as has been described.

However, if the color storage location used to store the color data value of this latest color was not the next-to-last color storage location, then the pixel sample remains in a partially colored state at 2180. Binary index values are stored in each of the sample color indices corresponding to the samples to which this latest color to be stored applies, with each of those binary index values being selected to require a mathematic operation to derive the correct binary index value that identifies the first available color storage location. As has been discussed, in this way, the binary index values stored across all of the sample color indices continues to form an invalid combination that continues to encode an indication that the pixel sample data is in a partially colored state.

Figure 9:
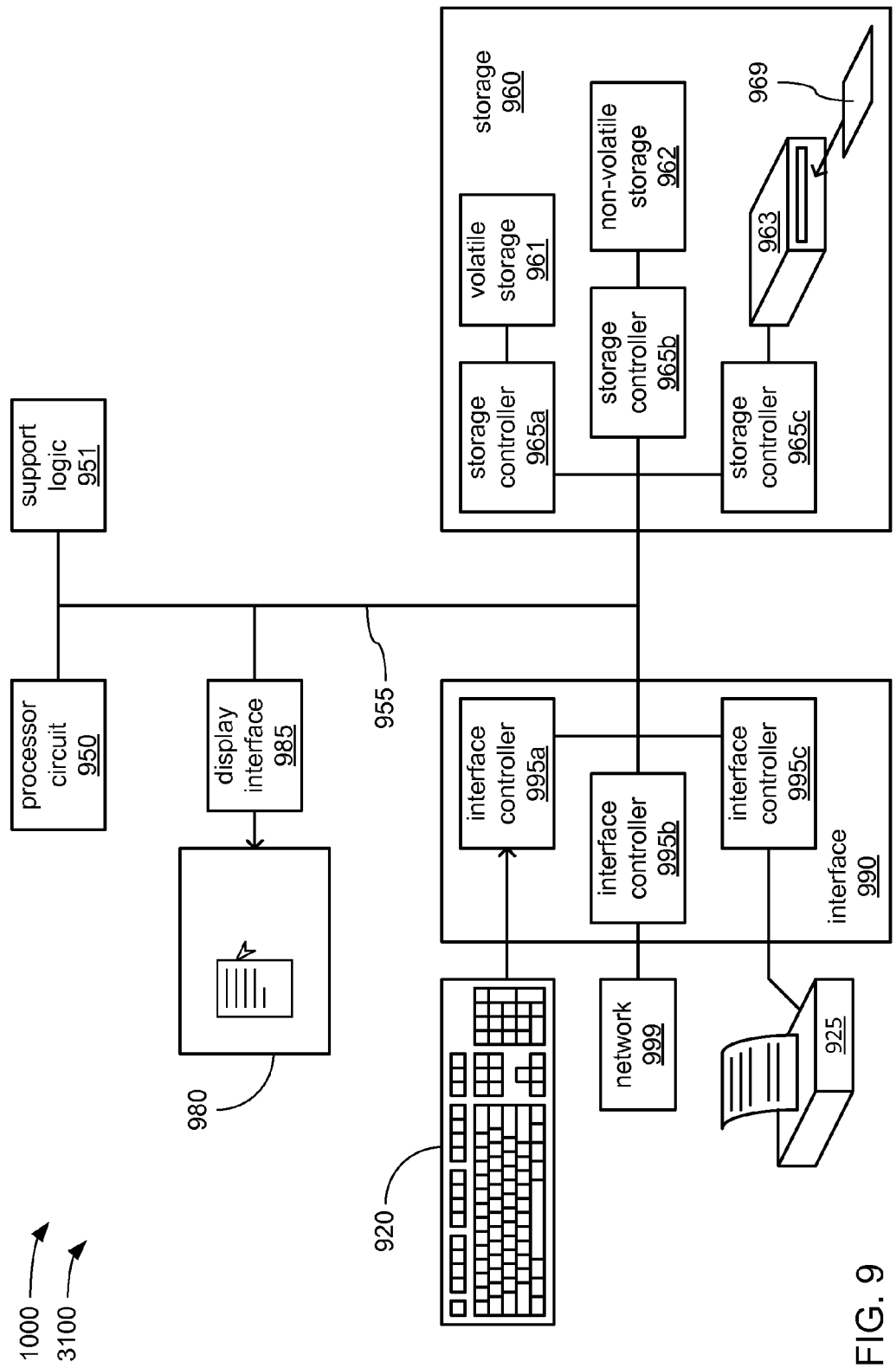
FIG. 9 illustrates an embodiment of a processing architecture.

FIG. 9 illustrates an embodiment of an exemplary processing architecture 3100 suitable for implementing various embodiments as previously described. More specifically, the processing architecture 3100 (or variants thereof) may be implemented as part of the computing device 1000 and/or the controller 200. It should be noted that components of the processing architecture 3100 are given reference numbers in which the last two digits correspond to the last two digits of reference numbers of components earlier depicted and described as part of the computing device 1000 and the controller 200. This is done as an aid to correlating such components of the computing device 1000 and the controller 200 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3100, a computing device includes at least a processor circuit 950, support logic 951, a storage 960, a controller 900, an interface 990 to other devices, and coupling 955. As will be explained, depending on various aspects of a computing device implementing the processing architecture 3100, including its intended use and/or conditions of use, such a computing device may further include additional components, such as without limitation, a display interface 985 and/or one or more cameras 910.

Coupling 955 includes one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990, the audio subsystem 970 and the display interface 985 (depending on which of these and/or other components are also present). With the processor circuit 950 being so coupled by couplings 955, the processor circuit 950 is able to perform the various ones of the tasks described at length, above, for whichever ones of the computing device 1000 and the controller 200 implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to the processor circuits 150 and 250) may include any of a wide variety of commercially available processors, employing any of a wide variety of technologies and implemented with one or more cores physically combined in any of a number of ways.

As previously discussed, the storage 960 (corresponding to the storage 160 and 260) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor circuit 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor circuit 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor circuit 950 as that routine is executed.

As previously discussed, the interface 990 (possibly corresponding to the interface 190) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 180), such a computing device implementing the processing architecture 3100 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing device 1000 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of a device includes a processor circuit and a storage communicatively coupled to the processor circuit to store instructions. When executed by the processor circuit the instructions cause the processor circuit to render a pixel from multiple samples taken of a three-dimensional model of an object, the pixel corresponding to a pixel sample data, the pixel sample data comprising multiple color storage locations that are each identified by a numeric identifier, and the pixel sample data comprising multiple sample color indices that each correspond to a sample of the multiple samples to point to at least one color storage location of the multiple color storage locations; and allocate color storage locations of the multiple color storage locations in an order selected to define a subset of possible combinations of binary index values among all of the sample color indices as invalid combinations.

The above example of a device in which the pixel includes one of 2, 4, 8 or 16 samples.

Either of the above examples of a device in which the processor circuit is to initialize the multiple sample color indices with binary index values that create an invalid combination of binary index values among all of the sample color indices that indicates the pixel sample data is initialized to an uncolored state, and defer storage of a clear color data value that specifies a clear color in any color storage location of the multiple color storage locations based on the invalid combination.

Any of the above examples of a device in which the first invalid combination of binary index values selected to comprise all bits of every binary index value set to 1 or all bits of every binary index value set to 0.

Any of the above examples of a device in which the device includes a display, the processor circuit to visually present an image comprising the pixel on the display.

Any of the above examples of a device in which the processor circuit is to allocate a first color storage location that is identified by a first numeric identifier in the selected order; store a first color data value that specifies a first color in the first color storage location, the first color applies to all samples of the multiple samples; store a binary index value in all sample color indices of the multiple sample color indices (the binary index value selected to indicate the first color data values is stored in all color storage locations and match the first numeric identifier to create a valid combination of binary index values among all of the sample color indices that indicates the pixel sample data is transitioned to a fully colored state); and refrain from storage of a clear color data value that specifies a clear color in any color storage location of the multiple color storage locations based on the valid combination and assignment of a color to all color storage locations.

Any of the above examples of a device in which the processor circuit is to allocate a first color storage location that is identified by a first numeric identifier in the selected order; store a first color data value that specifies a first color in the first color storage location, the first color applied to a first sample of the multiple samples and no color applied to a second sample of the multiple samples; store a first binary index value in a first sample color index of the multiple sample color indices that corresponds to the first sample (the first binary index value selected to indicate the first color data value is stored in the first color storage location and require use of an arithmetic operation to derive the first numeric identifier from the first binary index value to create a first invalid combination of binary index values among all of the sample color indices that indicates the pixel sample data is transitioned to a partially colored state); and defer storage of a clear color data value that specifies a clear color in any color storage location of the multiple color storage locations based on the first invalid combination.

Any of the above examples of a device in which the arithmetic operation includes one of subtracting a binary value of 01 from the first binary index or adding a binary value of 01 to the first binary index.

Any of the above examples of a device in which the processor circuit is to allocate a second color storage location that is identified by a second numeric identifier in the selected order; store a second color data value that specifies a second color in the second color storage location, the second color applied to the second sample; store a second binary index value in a second sample color index of the multiple sample color indices that corresponds to the second sample (the second binary index value selected to indicate the second color data value is stored in the second color storage location and match the second numeric identifier); determine that application of the second color to the second sample results in a fully colored state in which colors are applied to all samples of the multiple samples; based on the determination, store a third binary index value in the first sample color index (the third binary index value selected to indicate the first color data value is stored in the first color storage location and match the first numeric identifier to create a valid combination of binary index values among all of the sample color indices that indicates the pixel sample data is transitioned to a fully colored state); and refrain from storage of a clear color data value that specifies a clear color in any color storage location of the multiple color storage locations based on the valid combination and assignment of colors to all color storage locations.

Any of the above examples of a device in which the processor circuit is to allocate a second color storage location that is identified by a second numeric identifier in the selected order; store a second color data value that specifies a second color in the second color storage location, the second color applied to the second sample and no color applied to a third sample of the multiple samples; store a second binary index value in a second sample color index of the multiple sample color indices that corresponds to the second sample (the second binary index value selected to indicate the second color data value is stored in the second color storage location and require use of the arithmetic operation to derive the second numeric identifier from the second binary index value to create a second invalid combination of binary index values among all of the sample color indices that indicates the pixel sample remains in the partially colored state); and defer storage of a clear color data value that specifies a clear color in any color storage location of the multiple color storage locations based on the second invalid combination.

Any of the above examples of a device in which the processor circuit to allocate a second color storage location that is identified by a second numeric identifier in the selected order; store a second color data value that specifies a second color in the second color storage location, the second color applied to the second sample and no color applied to a third sample of the multiple samples; and based on a determination that the second color storage location is a next-to-last color storage location in the selected order and based on no color applied to the third sample: store a second binary index value in a second sample color index of the multiple sample color indices that corresponds to the second sample, the second binary index value selected to indicate the second color data value is stored in the second color storage location and selected to match the second numeric identifier; allocate a third color storage location that is identified by a third numeric identifier in the selected order; store a third color data value that specifies a clear color in the third color storage location; store a third binary index value in a third sample color index of the multiple sample color indices that corresponds to the third sample, the third binary index value selected to indicate the third color data value is stored in the third color storage location and selected to match the third numeric identifier; and store a fourth binary index value in the first sample color index (the fourth binary index value selected to indicate that the first color data value is stored in the first color storage location and match the first numeric identifier to create a valid combination of binary index values among all of the sample color indices that indicates the pixel sample data is transitioned to a fully colored state).

An example of another device includes a processor circuit and a storage communicatively coupled to the processor circuit to store instructions. When executed by the processor circuit the instructions cause the processor circuit to render a pixel from multiple samples taken of a three-dimensional model of an object, the pixel corresponding to a pixel sample data, the pixel sample data comprising multiple color storage locations that are each identified by a numeric identifier, and the pixel sample data comprising multiple sample color indices that each correspond to a sample of the multiple samples to point to at least one color storage location of the multiple color storage locations; allocate color storage locations of the multiple color storage locations in a selected order that defines a first subset of possible combinations of binary index values among all of the sample color indices as invalid combinations and a second subset of possible combinations of binary index values among all of the sample color indices as valid combinations; and defer storage of a clear color data value that specifies a clear color in any color storage location of the multiple color storage locations based on a current combination of the binary index values stored in all of the sample color indices comprising an invalid combination.

The above example of another device in which the processor circuit is to initialize the multiple sample color indices with binary index values that create a first invalid combination of binary index values among all of the sample color indices that indicates the pixel sample data is initialized to an uncolored state.

Either of the above examples of another device in which the first invalid combination comprising all bits of every binary index value set to 1 or all bits of every binary index value set to 0.

Any of the above examples of another device in which the processor circuit is to defer storing a clear color data value that specifies a clear color in a color storage location of the multiple color storage locations based on a current combination of all of the binary index values stored in all of the sample color indices comprising an invalid combination until a next-to-last color storage location in the selected order is allocated to store a color data value that specifies a color derived from rendering a sample of the multiple samples.

Any of the above examples of another device in which the processor circuit is to refrain from storing a clear color data value that specifies a clear color in a color storage location of the multiple color storage locations based on a current combination of all of the binary index values stored in all of the sample color indices comprising a valid combination, and based on a next-to-last color storage location in the selected order not being allocated to store a color data value that specifies a color derived from rendering a sample of the multiple samples.

An example of a computer-implemented method in which the method includes rendering a pixel from multiple samples taken of a three-dimensional model of an object, the pixel corresponding to a pixel sample data, the pixel sample data comprising multiple color storage locations that are each identified by a numeric identifier, and the pixel sample data comprising multiple sample color indices that each correspond to a sample of the multiple samples to point to at least one color storage location of the multiple color storage locations; allocating color storage locations of the multiple color storage locations in an order selected to define a subset of possible combinations of binary index values among all of the sample color indices as invalid combinations; and initializing the multiple sample color indices with binary index values that create an invalid combination of binary index values among all of the sample color indices that indicates the pixel sample data is initialized to an uncolored state.

The above example of a computer-implemented method in which the method includes deferring storage of a clear color data value that specifies a clear color in any color storage location of the multiple color storage locations based on a current combination of the binary index values stored in all of the sample color indices comprising an invalid combination.

Either of the above examples of a computer-implemented method in which the method includes allocating a first color storage location that is identified by a first numeric identifier in the selected order; storing a first color data value that specifies a first color in the first color storage location, the first color applies to all samples of the multiple samples; storing a binary index value in all sample color indices of the multiple sample color indices (the binary index value selected to indicate the first color data values is stored in all color storage locations and match the first numeric identifier to create a valid combination of binary index values among all of the sample color indices that indicates the pixel sample data is transitioned to a fully colored state); and refraining from storage of a clear color data value that specifies a clear color in any color storage location of the multiple color storage locations based on the valid combination and assignment of a color to all color storage locations.

Any of the above examples of a computer-implemented method in which the method includes allocating a first color storage location that is identified by a first numeric identifier in the selected order; storing a first color data value that specifies a first color in the first color storage location, the first color applied to a first sample of the multiple samples and no color applied to a second sample of the multiple samples; storing a first binary index value in a first sample color index of the multiple sample color indices that corresponds to the first sample (the first binary index value selected to indicate the first color data value is stored in the first color storage location, and require use of an arithmetic operation to derive the first numeric identifier from the first binary index value to create a first invalid combination of binary index values among all of the sample color indices that indicates the pixel sample data is transitioned to a partially colored state); and deferring storage of a clear color data value that specifies a clear color in any color storage location of the multiple color storage locations based on the first invalid combination.

Any of the above examples of a computer-implemented method in which the arithmetic operation comprising one of subtracting a binary value of 01 from the first binary index or adding a binary value of 01 to the first binary index.

Any of the above examples of a computer-implemented method in which the method includes allocating a second color storage location that is identified by a second numeric identifier in the selected order; storing a second color data value that specifies a second color in the second color storage location, the second color applied to the second sample; storing a second binary index value in a second sample color index of the multiple sample color indices that corresponds to the second sample (the second binary index value selected to indicate the second color data value is stored in the second color storage location and match the second numeric identifier); determining that application of the second color to the second sample results in a fully colored state in which colors are applied to all samples of the multiple samples; based on the determination, storing a third binary index value in the first sample color index (the third binary index value selected to indicate the first color data value is stored in the first color storage location and match the first numeric identifier to create a valid combination of binary index values among all of the sample color indices that indicates the pixel sample data is transitioned to a fully colored state); and refraining from storage of a clear color data value that specifies a clear color in any color storage location of the multiple color storage locations based on the valid combination and assignment of colors to all color storage locations.

Any of the above examples of a computer-implemented method in which the method includes allocating a second color storage location that is identified by a second numeric identifier in the selected order; storing a second color data value that specifies a second color in the second color storage location, the second color applied to the second sample and no color applied to a third sample of the multiple samples; based on a determination that the second color storage location is a next-to-last color storage location in the selected order and based on no color applied to the third sample: storing a second binary index value in a second sample color index of the multiple sample color indices that corresponds to the second sample, the second binary index value selected to indicate the second color data value is stored in the second color storage location and selected to match the second numeric identifier; allocating a third color storage location that is identified by a third numeric identifier in the selected order; storing a third color data value that specifies a clear color in the third color storage location; storing a third binary index value in a third sample color index of the multiple sample color indices that corresponds to the third sample, the third binary index value selected to indicate the third color data value is stored in the third color storage location and selected to match the third numeric identifier; and storing a fourth binary index value in the first sample color index (the fourth binary index value selected to indicating that the first color data value is stored in the first color storage location and match the first numeric identifier to create a valid combination of binary index values among all of the sample color indices that indicates the pixel sample data is transitioned to a fully colored state).

An example of at least one machine-readable storage medium includes instructions that when executed by a computing device, cause the computing device to render a pixel from multiple samples taken of a three-dimensional model of an object, the pixel corresponding to a pixel sample data, the pixel sample data comprising multiple color storage locations that are each identified by a numeric identifier, and the pixel sample data comprising multiple sample color indices that each correspond to a sample of the multiple samples to point to at least one color storage location of the multiple color storage locations; allocate color storage locations of the multiple color storage locations in a selected order that defines a first subset of possible combinations of binary index values among all of the sample color indices as invalid combinations and a second subset of possible combinations of binary index values among all of the sample color indices as valid combinations; and defer storage of a clear color data value that specifies a clear color in any color storage location of the multiple color storage locations based on a current combination of the binary index values stored in all of the sample color indices comprising an invalid combination.

The above example of at least one machine-readable storage medium in which the computing device is caused to defer storing a clear color data value that specifies a clear color in a color storage location of the multiple color storage locations based on a current combination of all of the binary index values stored in all of the sample color indices comprising an invalid combination until a next-to-last color storage location in the selected order is allocated to store a color data value that specifies a color derived from rendering a sample of the multiple samples.

Either of the above examples of at least one machine-readable storage medium in which the computing device is caused to refrain from storing a clear color data value that specifies a clear color in a color storage location of the multiple color storage locations based on a current combination of all of the binary index values stored in all of the sample color indices comprising a valid combination, and based on a next-to-last color storage location in the selected order not being allocated to store a color data value that specifies a color derived from rendering a sample of the multiple samples.

The invention claimed is:

1. A device comprising:
   a processor circuit; and
   a storage communicatively coupled to the processor circuit to store instructions that when executed by the processor circuit cause the processor circuit to:
     render a pixel from multiple samples taken of a three-dimensional model of an object, the pixel corresponding to a pixel sample data, the pixel sample data comprising multiple color storage locations that are each identified by a numeric identifier, and the pixel sample data comprising multiple sample color indices that each correspond to a sample of the multiple samples to point to at least one color storage location of the multiple color storage locations;
     allocate color storage locations of the multiple color storage locations in an order selected to define a subset of possible combinations of binary index values among all of the sample color indices as invalid combinations; and
     initialize the multiple sample color indices with binary index values that create a first invalid combination of binary index values among all of the sample color indices that indicates the pixel sample data is initialized to an uncolored state.

2. The device of claim 1, the pixel comprising one of 2, 4, 8 or 16 samples.

3. The device of claim 1, comprising one of:
   a display, the processor circuit to visually present an image comprising the pixel on the display; and
   an interface coupling the processor circuit to a network, the processor circuit to operate the interface to transmit a final image data comprising the pixel sample data and defining an image comprising the pixel to another computing device via the network.

4. The device of claim 1, the processor circuit to
defer storage of a clear color data value that specifies a clear color in any color storage location of the multiple color storage locations based on the first invalid combination.

5. The device of claim 4, the first invalid combination of binary index values selected to comprise all bits of every binary index value set to 1 or all bits of every binary index value set to 0.

6. The device of claim 4, the processor circuit to:
allocate a first color storage location that is identified by a first numeric identifier in the selected order;
store a first color data value that specifies a first color in the first color storage location, the first color applies to all samples of the multiple samples;
store a binary index value in all sample color indices of the multiple sample color indices, the binary index value selected to:
indicate the first color data value is stored in the first color storage location; and
match the first numeric identifier to create a valid combination of binary index values among all of the sample color indices that indicates the pixel sample data is transitioned to a fully colored state; and
refrain from storage of a clear color data value that specifies a clear color in any color storage location of the multiple color storage locations based on the valid combination and assignment of a color to all color storage locations.

7. The device of claim 4, the processor circuit to:
allocate a first color storage location that is identified by a first numeric identifier in the selected order;
store a first color data value that specifies a first color in the first color storage location, the first color applied to a first sample of the multiple samples and no color applied to a second sample of the multiple samples;
store a first binary index value in a first sample color index of the multiple sample color indices that corresponds to the first sample, the first binary index value selected to:
indicate the first color data value is stored in the first color storage location; and
require use of an arithmetic operation to derive the first numeric identifier from the first binary index value to create a second invalid combination of binary index values among all of the sample color indices that indicates the pixel sample data is transitioned to a partially colored state; and
defer storage of a clear color data value that specifies a clear color in any color storage location of the multiple color storage locations based on the second invalid combination.

8. The device of claim 7, the arithmetic operation comprising one of subtracting a binary value of 01 from the first binary index or adding a binary value of 01 to the first binary index.

9. The device of claim 7, the processor circuit to:
allocate a second color storage location that is identified by a second numeric identifier in the selected order;
store a second color data value that specifies a second color in the second color storage location, the second color applied to the second sample;
store a second binary index value in a second sample color index of the multiple sample color indices that corresponds to the second sample, the second binary index value selected to:
indicate the second color data value is stored in the second color storage location; and
match the second numeric identifier;
determine that application of the second color to the second sample results in a fully colored state in which colors are applied to all samples of the multiple samples;
based on the determination, store a third binary index value in the first sample color index, the third binary index value selected to:
indicate the first color data value is stored in the first color storage location; and
match the first numeric identifier to create a valid combination of binary index values among all of the sample color indices that indicates the pixel sample data is transitioned to a fully colored state; and
refrain from storage of a clear color data value that specifies a clear color in any color storage location of the multiple color storage locations based on the valid combination and assignment of colors to all color storage locations.

10. The device of claim 7, the processor circuit to:
allocate a second color storage location that is identified by a second numeric identifier in the selected order;
store a second color data value that specifies a second color in the second color storage location, the second color applied to the second sample and no color applied to a third sample of the multiple samples;
store a second binary index value in a second sample color index of the multiple sample color indices that corresponds to the second sample, the second binary index value selected to:
indicate the second color data value is stored in the second color storage location; and
require use of the arithmetic operation to derive the second numeric identifier from the second binary index value to create a third invalid combination of binary index values among all of the sample color indices that indicates the pixel sample remains in the partially colored state; and
defer storage of a clear color data value that specifies a clear color in any color storage location of the multiple color storage locations based on the third invalid combination.

11. The device of claim 7, the processor circuit to:
allocate a second color storage location that is identified by a second numeric identifier in the selected order;
store a second color data value that specifies a second color in the second color storage location, the second color applied to the second sample and no color applied to a third sample of the multiple samples; and
based on a determination that the second color storage location is a next-to-last color storage location in the selected order and based on no color applied to the third sample:
store a second binary index value in a second sample color index of the multiple sample color indices that corresponds to the second sample, the second binary index value selected to indicate the second color data value is stored in the second color storage location and selected to match the second numeric identifier;
allocate a third color storage location that is identified by a third numeric identifier in the selected order;
store a third color data value that specifies a clear color in the third color storage location;
store a third binary index value in a third sample color index of the multiple sample color indices that corresponds to the third sample, the third binary index value selected to indicate the third color data value is stored in the third color storage location and selected to match the third numeric identifier; and store a fourth binary index value in the first sample color index, the fourth binary index value selected to:
    indicate that the first color data value is stored in the first color storage location; and
    match the first numeric identifier to create a valid combination of binary index values among all of the sample color indices that indicates the pixel sample data is transitioned to a fully colored state.

12. A device comprising:
a processor circuit; and
a storage communicatively coupled to the processor circuit to store instructions that when executed by the processor circuit cause the processor circuit to:
    render a pixel from multiple samples taken of a three-dimensional model of an object, the pixel corresponding to a pixel sample data, the pixel sample data comprising multiple color storage locations that are each identified by a numeric identifier, and the pixel sample data comprising multiple sample color indices that each correspond to a sample of the multiple samples to point to at least one color storage location of the multiple color storage locations;
    allocate color storage locations of the multiple color storage locations in a selected order that defines a first subset of possible combinations of binary index values among all of the sample color indices as invalid combinations and a second subset of possible combinations of binary index values among all of the sample color indices as valid combinations; and
    defer storage of a clear color data value that specifies a clear color in any color storage location of the multiple color storage locations based on a current combination of the binary index values stored in all of the sample color indices comprising an invalid combination until a next-to-last color storage location in the selected order is allocated to store a color data value that specifies a color derived from rendering a sample of the multiple samples.

13. The device of claim 12, the processor circuit to initialize the multiple sample color indices with binary index values that create a first invalid combination of binary index values among all of the sample color indices that indicates the pixel sample data is initialized to an uncolored state.

14. The device of claim 13, the first invalid combination comprising all bits of every binary index value set to 1 or all bits of every binary index value set to 0.

15. The device of claim 12, the processor circuit to refrain from storing a clear color data value that specifies a clear color in a color storage location of the multiple color storage locations based on a current combination of all of the binary index values stored in all of the sample color indices comprising a valid combination, and based on a next-to-last color storage location in the selected order not being allocated to store a color data value that specifies a color derived from rendering a sample of the multiple samples.

16. The device of claim 12, comprising one of:
a display, the processor circuit to visually present an image comprising the pixel on the display; and
an interface coupling the processor circuit to a network, the processor circuit to operate the interface to transmit a final image data comprising the pixel sample data defining an image comprising the pixel to another computing device via the network.

17. A computer-implemented method comprising:
rendering a pixel from multiple samples taken of a three-dimensional model of an object, the pixel corresponding to a pixel sample data, the pixel sample data comprising multiple color storage locations that are each identified by a numeric identifier, and the pixel sample data comprising multiple sample color indices that each correspond to a sample of the multiple samples to point to at least one color storage location of the multiple color storage locations;
allocating color storage locations of the multiple color storage locations in an order selected to define a subset of possible combinations of binary index values among all of the sample color indices as invalid combinations; and
initializing the multiple sample color indices with binary index values that create a first invalid combination of binary index values among all of the sample color indices that indicates the pixel sample data is initialized to an uncolored state.

18. The computer-implemented method of claim 17, comprising deferring storage of a clear color data value that specifies a clear color in any color storage location of the multiple color storage locations based on a current combination of the binary index values stored in all of the sample color indices comprising an invalid combination.

19. The computer-implemented method of claim 17, comprising:
allocating a first color storage location that is identified by a first numeric identifier in the selected order;
storing a first color data value that specifies a first color in the first color storage location, the first color applies to all samples of the multiple samples;
storing a binary index value in all sample color indices of the multiple sample color indices, the binary index value selected to:
    indicate the first color data value is stored in the first color storage location; and
    match the first numeric identifier to create a valid combination of binary index values among all of the sample color indices that indicates the pixel sample data is transitioned to a fully colored state; and
refraining from storage of a clear color data value that specifies a clear color in any color storage location of the multiple color storage locations based on the valid combination and assignment of a color to all color storage locations.

20. The computer-implemented method of claim 17, comprising:
allocating a first color storage location that is identified by a first numeric identifier in the selected order;
storing a first color data value that specifies a first color in the first color storage location, the first color applied to a first sample of the multiple samples and no color applied to a second sample of the multiple samples;
storing a first binary index value in a first sample color index of the multiple sample color indices that corresponds to the first sample, the first binary index value selected to:
    indicate the first color data value is stored in the first color storage location; and
    require use of an arithmetic operation to derive the first numeric identifier from the first binary index value to create a second invalid combination of binary index values among all of the sample color indices that indicates the pixel sample data is transitioned to a partially colored state; and
deferring storage of a clear color data value that specifies a clear color in any color storage location of the multiple color storage locations based on the second invalid combination.

21. The computer-implemented method of claim 20, the arithmetic operation comprising one of subtracting a binary value of 01 from the first binary index or adding a binary value of 01 to the first binary index.

22. The computer-implemented method of claim 20, comprising:
- allocating a second color storage location that is identified by a second numeric identifier in the selected order;
- storing a second color data value that specifies a second color in the second color storage location, the second color applied to the second sample;
- storing a second binary index value in a second sample color index of the multiple sample color indices that corresponds to the second sample, the second binary index value selected to:
  - indicate the second color data value is stored in the second color storage location; and
  - match the second numeric identifier;
- determining that application of the second color to the second sample results in a fully colored state in which colors are applied to all samples of the multiple samples;
- based on the determination, storing a third binary index value in the first sample color index, the third binary index value selected to:
  - indicate the first color data value is stored in the first color storage location; and
  - match the first numeric identifier to create a valid combination of binary index values among all of the sample color indices that indicates the pixel sample data is transitioned to a fully colored state; and
- refraining from storage of a clear color data value that specifies a clear color in any color storage location of the multiple color storage locations based on the valid combination and assignment of colors to all color storage locations.

23. The computer-implemented method of claim 20, comprising:
- allocating a second color storage location that is identified by a second numeric identifier in the selected order;
- storing a second color data value that specifies a second color in the second color storage location, the second color applied to the second sample and no color applied to a third sample of the multiple samples;
- based on a determination that the second color storage location is a next-to-last color storage location in the selected order and based on no color applied to the third sample:
  - storing a second binary index value in a second sample color index of the multiple sample color indices that corresponds to the second sample, the second binary index value selected to indicate the second color data value is stored in the second color storage location and selected to match the second numeric identifier;
  - allocating a third color storage location that is identified by a third numeric identifier in the selected order;
  - storing a third color data value that specifies a clear color in the third color storage location;
  - storing a third binary index value in a third sample color index of the multiple sample color indices that corresponds to the third sample, the third binary index value selected to indicate the third color data value is stored in the third color storage location and selected to match the third numeric identifier; and
  - storing a fourth binary index value in the first sample color index, the fourth binary index value selected to:
    - indicating that the first color data value is stored in the first color storage location; and
    - match the first numeric identifier to create a valid combination of binary index values among all of the sample color indices that indicates the pixel sample data is transitioned to a fully colored state.

24. The computer-implemented method of claim 17, the method comprising one of visually presenting an image comprising the pixel on a display, and transmitting a final image data comprising the pixel sample data and defining an image comprising the pixel to another computing device via a network.

25. At least one non-transitory machine-readable storage medium comprising instructions that when executed by a computing device, cause the computing device to:
- render a pixel from multiple samples taken of a three-dimensional model of an object, the pixel corresponding to a pixel sample data, the pixel sample data comprising multiple color storage locations that are each identified by a numeric identifier, and the pixel sample data comprising multiple sample color indices that each correspond to a sample of the multiple samples to point to at least one color storage location of the multiple color storage locations;
- allocate color storage locations of the multiple color storage locations in a selected order that defines a first subset of possible combinations of binary index values among all of the sample color indices as invalid combinations and a second subset of possible combinations of binary index values among all of the sample color indices as valid combinations; and
- defer storage of a clear color data value that specifies a clear color in any color storage location of the multiple color storage locations based on a current combination of the binary index values stored in all of the sample color indices comprising an invalid combination until a next-to-last color storage location in the selected order is allocated to store a color data value that specifies a color derived from rendering a sample of the multiple samples.

26. The at least one non-transitory machine-readable storage medium of claim 25, the computing device caused to refrain from storing a clear color data value that specifies a clear color in a color storage location of the multiple color storage locations
- based on a current combination of all of the binary index values stored in all of the sample color indices comprising a valid combination, and
- based on a next-to-last color storage location in the selected order not being allocated to store a color data value that specifies a color derived from rendering a sample of the multiple samples.

27. The at least one non-transitory machine-readable storage medium of claim 25, the computing device caused to visually present an image comprising the pixel on a display.

28. The at least one non-transitory machine-readable storage medium of claim 25, the computing device caused to transmit a final image data comprising the pixel sample data and defining an image comprising the pixel to another computing device via a network.

* * * * *